(12) United States Patent
Villegas et al.

(10) Patent No.: US 11,704,865 B2
(45) Date of Patent: Jul. 18, 2023

(54) INSERTING THREE-DIMENSIONAL OBJECTS INTO DIGITAL IMAGES WITH CONSISTENT LIGHTING VIA GLOBAL AND LOCAL LIGHTING INFORMATION

(71) Applicant: Adobe Inc., San Jose, CA (US)

(72) Inventors: Ruben Villegas, Ann Arbor, MI (US); Yunseok Jang, Ann Arbor, MI (US); Duygu Ceylan Aksit, Mountain View, CA (US); Jimei Yang, Merced, CA (US); Xin Sun, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 27 days.

(21) Appl. No.: 17/383,294

(22) Filed: Jul. 22, 2021

(65) Prior Publication Data

US 2023/0037591 A1 Feb. 9, 2023

(51) Int. Cl.
| | | |
|---|---|---|
| *G06T 15/50* | (2011.01) | |
| *G06T 15/20* | (2011.01) | |
| *G06T 15/04* | (2011.01) | |
| *G06T 15/06* | (2011.01) | |

(Continued)

(52) U.S. Cl.
CPC ............ *G06T 15/506* (2013.01); *G06N 3/04* (2013.01); *G06T 7/70* (2017.01); *G06T 15/04* (2013.01); *G06T 15/06* (2013.01); *G06T 15/20* (2013.01)

(58) Field of Classification Search
None
See application file for complete search history.

(56) References Cited

U.S. PATENT DOCUMENTS

| | | | |
|---|---|---|---|
| 11,272,164 B1 * | 3/2022 | Xing | ............... G06F 9/445 |
| 2019/0251401 A1 * | 8/2019 | Shechtman | ...... G06V 30/19173 |
| 2020/0019041 A1 * | 1/2020 | Moltaji | ............... G06T 17/20 |

(Continued)

OTHER PUBLICATIONS

Alex Mendez-Feliu and Mateu Sbert, "From obscurances to ambient occlusion: A survey", Visual Comput (2009) 25: 181-196, DOI 10.1007/s00371-008-0213-4, Published online: Feb. 15, 2008, © Springer-Verlag 2008 (Year: 2009).*

(Continued)

*Primary Examiner* — Tize Ma
(74) *Attorney, Agent, or Firm* — Keller Preece PLLC

(57) ABSTRACT

This disclosure describes methods, non-transitory computer readable storage media, and systems that generate realistic shading for three-dimensional objects inserted into digital images. The disclosed system utilizes a light encoder neural network to generate a representation embedding of lighting in a digital image. Additionally, the disclosed system determines points of the three-dimensional object visible within a camera view. The disclosed system generates a self-occlusion map for the digital three-dimensional object by determining whether fixed sets of rays uniformly sampled from the points intersects with the digital three-dimensional object. The disclosed system utilizes a generator neural network to determine a shading map for the digital three-dimensional object based on the representation embedding of lighting in the digital image and the self-occlusion map. Additionally, the disclosed system generates a modified digital image with the three-dimensional object inserted into the digital image with consistent lighting of the three-dimensional object and the digital image.

20 Claims, 13 Drawing Sheets

(51) Int. Cl.
G06T 7/70 (2017.01)
G06N 3/04 (2023.01)

(56) References Cited

U.S. PATENT DOCUMENTS

2020/0363815 A1* 11/2020 Mousavian .......... G06N 3/0454
2022/0051093 A1* 2/2022 Skaljak .................. G06N 3/084

OTHER PUBLICATIONS

Adobe. Mixamo, 2021 (accessed Mar. 6, 2021).
APEX. A PyTorch Extension: Tools for Easy Mixed Precision and Distributed Training in PyTorch, 2020 (accessed Nov. 3, 2020).
Sai Bi, Kalyan Sunkavalli, Federico Perazzi, Eli Shechtman, Vladimir Kim, and Ravi Ramamoorthi. Deep CG2Real: Synthetic-to-Real Translation via Image Disentanglement. In Int. Conf. Comput. Vis., 2019.
John Canny. A Computational Approach to Edge Detection. IEEE Trans. Pattern Anal. Mach. Intell., 1986.
Carnegie-Mellon. MoCap Database, 2021 (accessed Mar. 6, 2021).
Wenyan Cong, Jianfu Zhang, Li Niu, Liu Liu, Zhixin Ling, Weiyuan Li, and Liqing Zhang. DoveNet: Deep Image Harmonization via Domain Verification. In IEEE Conf. Comput. Vis. Pattern Recog., 2020.
Paul Debevec. Rendering Synthetic Objects into Real Scenes: Bridging Traditional and Image-Based Graphics with Global Illumination and High Dynamic Range Photography. In ACM Int. Conf. Exhib. Comput. Graph. Interact. Technol., 1998.
Emily Denton and Rob Fergus. Stochastic Video Generation with a Learned Prior. In Int. Conf. Mach. Learn., 2018.
Alexey Dosovitskiy, Philipp Fischer, Eddy Ilg, Philip Hausser, Caner Hazirbas, Vladimir Golkov, Patrick Van Der Smagt, Daniel Cremers, and Thomas Brox. FlowNet: Learning Optical Flow with Convolutional Metworks. In Int. Conf. Comput. Vis., 2015.
Christoph Feichtenhofer, Haoqi Fan, Jitendra Malik, and Kaiming He. SlowFast Networks for Video Recognition. In Int. Conf. Comput. Vis., 2019.
Leon A Gatys, Alexander S Ecker, and Matthias Bethge. Image Style Transfer Using Convolutional Neural Networks. In IEEE Conf. Comput. Vis. Pattern Recog., 2016.
Mar Gonzalez Franco, Eyal Ofek, Ye Pan, Angus Antley, Anthony Steed, Bernhard Spanlang, Antonella Maselli, Domna Banakou, Nuria Pelechano, Sergio Orts-Escolano, Veronica Orvalho, Laura Trutoiu, Markus Wojcik, Maria V. Sanchez-Vives, Jeremy Bailenson, Mel Slater, and Jaron Lanier. The Rocketbox Library and the Utility of Freely Available Rigged Avatars. Frontiers in Virtual Reality, 2020.
Ian J. Goodfellow, Jean Pouget-Abadie, Mehdi Mirza, Bing Xu, David Warde-Farley, Sherjil Ozair, Aaron Courville, and Yoshua Bengio. Generative Adversarial Networks. In Adv. Neural Inform. Process. Syst., 2014.
Robin Green. Spherical harmonic lighting: The gritty details. Game Developers Conference, 2003.
HDRI Haven. HDRI Heaven, 2021 (accessed Mar. 6, 2021).
Kaiming He, Xiangyu Zhang, Shaoqing Ren, and Jian Sun. Deep Residual Learning for Image Recognition. In IEEE Conf. Comput. Vis. Pattern Recog., 2016.
Judy Hoffman, Eric Tzeng, Taesung Park, Jun-Yan Zhu, Phillip Isola, Kate Saenko, Alexei Efros, and Trevor Darrell. CyCADA: Cycle-Consistent Adversarial Domain Adaptation. In Int. Conf. Mach. Learn., 2018.
Yannick Hold-Geoffroy, Akshaya Athawale, and Jean-Francois Lalonde. Deep Sky Modeling for Single Image Outdoor Lighting Estimation. In IEEE Conf. Comput. Vis. Pattern Recog., 2019.
Yannick Hold-Geoffroy, Kalyan Sunkavalli, Sunil Hadap, Emiliano Gambaretto, and Jean-Francois Lalonde. Deep Outdoor Illumination Estimation. InIEEE Conf. Comput. Vis. Pattern Recog., 2019.
Phillip Isola, Jun-Yan Zhu, Tinghui Zhou, and Alexei A. Efros. Image-to-Image Translation with Conditional Adversarial Networks. InIEEE Conf. Comput. Vis. Pattern Recog., 2017.
Justin Johnson, Alexandre Alahi, and Li Fei-Fei. Perceptual Losses for Real-Time Style Transfer and Super-Resolution. In Eur. Conf. Comput. Vis., 2016.
Hanbyul Joo, Tomas Simon, and Yaser Sheikh. Total Capture: A 3D Deformation Model for Tracking Faces, Hands, and Bodies. InIEEE Conf. Comput. Vis. Pattern Recog., 2018.
James T Kajiya. The Rendering Equation. InACM Int. Conf. Exhib. Comput. Graph. Interact. Technol., 1986.
Angjoo Kanazawa, Jason Y. Zhang, Panna Felsen, and Jitendra Malik. Learning 3D Human Dynamics from Video. In IEEE Conf. Comput. Vis. Pattern Recog., 2019.
Diederik P. Kingma and Jimmy Ba. Adam: A Method for Stochastic Optimization. InInt. Conf. Learn. Represent., 2015.
Christoph Lassner, Javier Romero, Martin Kiefel, Federica Bogo, Michael J Black, and Peter V Gehler. Unite the People: Closing the Loop Between 3D and 2D Human Representations. InIEEE Conf. Comput. Vis. Pattern Recog., 2017.
Ming-Yu Liu, Thomas Breuel, and Jan Kautz. Unsupervised Image-to-Image Translation Networks. InAdv. Neural Inform. Process. Syst., 2017.
Wen Liu, Zhixin Piao, Jie Min, Wenhan Luo, Lin Ma, and Shenghua Gao. Liquid Warping GAN: A Unified Framework for Human Motion Imitation, Appearance Transfer and Novel View Synthesis. InInt. Conf. Comput. Vis., 2019.
Matthew Loper, Naureen Mahmood, Javier Romero, Gerard Pons-Moll, and Michael J. Black. SMPL: A Skinned Multi-Person Linear Model.ACM Trans. Graph., 2015 part 1.
Matthew Loper, Naureen Mahmood, Javier Romero, Gerard Pons-Moll, and Michael J. Black. SMPL: A Skinned Multi-Person Linear Model.ACM Trans. Graph., 2015 part 2.
Matthew Loper, Naureen Mahmood, Javier Romero, Gerard Pons-Moll, and Michael J. Black. SMPL: A Skinned Multi-Person Linear Model.ACM Trans. Graph., 2015 part 3.
Matthew Loper, Naureen Mahmood, Javier Romero, Gerard Pons-Moll, and Michael J. Black. SMPL: A Skinned Multi-Person Linear Model.ACM Trans. Graph., 2015 part 4.
Paulius Micikevicius, Sharan Narang, Jonah Alben, Gregory Diamos, Erich Eisen, David Garcia, Boris Ginsburg, Michael Houston, Oleksii Kuchaiev, Ganesh Venkatesh, and Hao Wu. Mixed Precision Training. InInt. Conf. Learn. Represent., 2018.
Takeru Miyato and Masanori Koyama. cGANs with Projection Discriminator. InInt. Conf. Learn. Represent., 2018.
Franziska Mueller, Florian Bernard, Oleksandr Sotnychenko, Dushyant Mehta, Srinath Sridhar, Dan Casas, and Christian Theobalt. GANerated Hands for Real-Time 3D Hand Tracking from Monocular RGB. In IEEE Conf. Comput. Vis. Pattern Recog., 2018.
Alejandro Newell, Kaiyu Yang, and Jia Deng. Stacked Hourglass Networks for Human Pose Estimation. InEur. Conf. Comput. Vis., 2016.
Gabriel L Oliveira, Abhinav Valada, Claas Bollen, Wolfram Burgard, and Thomas Brox. Deep Learning for Human Part Discovery in Images. InIEEE Int. Conf. Robot. Autom., 2016.
Aaron van den Oord, Yazhe Li, and Oriol Vinyals. Representation Learning with Contrastive Predictive Coding. arXiv:1807.03748, 2018.
Michael Oren and Shree K. Nayar. Generalization of Lambert's Reflectance Model. In ACM Int. Conf. Exhib. Comput. Graph. Interact. Technol., 1994.
Taesung Park, Alexei A. Efros, Richard Zhang, and Jun-Yan Zhu. Contrastive Learning for Unpaired Image-to-Image Translation. In Eur. Conf. Comput. Vis., 2020.
Leonid Pishchulin, Arjun Jain, Mykhaylo Andriluka, Thorsten Thormahlen, and Bernt Schiele. Articulated People Detection and Pose Estimation: Reshaping the Future. In IEEE Conf. Comput. Vis. Pattern Recog., 2012.
Francois Pitie, Anil C Kokaram, and Rozenn Dahyot. N-Dimensional Probablility Density Function Transfer and its Application to Color Transfer. In Int. Conf. Comput. Vis., 2005.

(56) References Cited

OTHER PUBLICATIONS

Albert Pumarola, Jordi Sanchez, Gary Choi, Alberto Sanfeliu, and Francesc Moreno-Noguer. 3DPeople: Modeling the Geometry of Dressed Humans. In Int. Conf. Comput. Vis., 2019.
Hossein Rahmani and Ajmal Mian. Learning a Non-linear Knowledge Transfer Model for Cross-view Action Recognition. In IEEE Conf. Comput. Vis. Pattern Recog., 2015.
Scott Reed, Zeynep Akata, Xinchen Yan, Lajanugen Logeswaran, Bernt Schiele, and Honglak Lee. Generative Adversarial Text-to-Image Synthesis. In Int. Conf. Mach. Learn., 2016.
Erik Reinhard, Michael Adhikhmin, Bruce Gooch, and Peter Shirley. Color Transfer between Images. IEEE Comput. Graph. Appl., 2001.
Kathleen M. Robinette, Sherri Blackwell, Hein Daanen, Mark Boehmer, Scott Fleming, Tina Brill, David Hoeferlin, and Dennis Burnsides. Civilian American and European Surface Anthropometry Resource (CAESAR), 2002.
Shunsuke Saito, Zeng Huang, Ryota Natsume, Shigeo Morishima, Angjoo Kanazawa, and Hao Li. PIFu: Pixel-Aligned Implicit Function for High-Resolution Clothed Human Dig-itization. In Int. Conf. Comput. Vis., 2019.
Shunsuke Saito, Tomas Simon, Jason Saragih, and Hanbyul Joo. Pifuhd: Multi-level pixel-aligned implicit function for high-resolution 3d human digitization. In IEEE Conf. Comput. Vis. Pattern Recog., 2020.
Kalpana Seshadrinathan and Alan Conrad Bovik. Motion Tuned Spatio-Temporal Quality Assessment of Natural Videos. IEEE Trans. Image Process., 2009.
Jamie Shotton, Ross Girshick, Andrew Fitzgibbon, Toby Sharp, Mat Cook, Mark Finocchio, Richard Moore, Pushmeet Kohli, Antonio Criminisi, Alex Kipman, and Andrew Blake. Efficient Human Pose Estimation from Single Depth Images. IEEE Trans. Pattern Anal. Mach. Intell., 2012.
Cristian Sminchisescu, Atul Kanaujia, and Dimitris Metaxas. Learning Joint Top-down and Bottom-up Processes for 3D Visual Inference. In IEEE Conf. Comput. Vis. Pattern Recog., 2006.
Kalyan Krishna Sunkavalli, Micah Kimo Johnson, Wojciech Matusik, and Hanspeter Pfister. Multi-Scale Image Harmonization.ACM Trans. Graph., 2010 part 1.
Kalyan Krishna Sunkavalli, Micah Kimo Johnson, Wojciech Matusik, and Hanspeter Pfister. Multi-Scale Image Harmonization.ACM Trans. Graph., 2010 part 2.
Yi-Hsuan Tsai, Xiaohui Shen, Zhe Lin, Kalyan Sunkavalli, Xin Lu, and Ming-Hsuan Yang. Deep Image Harmonization. In IEEE Conf. Comput. Vis. Pattern Recog., 2017.
Thomas Unterthiner, Sjoerd van Steenkiste, Karol Kurach, Raphael Marinier, Marcin Michalski, and Sylvain Geliy. Fvd: A new metric for video generation. InICLR Workshop, 2019.
Gul Varol, Javier Romero, Xavier Martin, Naureen Mahmood, Michael J. Black, Ivan Laptev, and Cordelia Schmid. Learning from Synthetic Humans. InIEEE Conf. Comput. Vis. Pattern Recog., 2017.
Ruben Villegas, Jimei Yang, Seunghoon Hong, Xunyu Lin, and Honglak Lee. Decomposing Motion and Content for Natural Video Sequence Prediction. InInt. Conf. Learn. Represent., 2017.
Ruben Villegas, Jimei Yang, Yuliang Zou, Sungryull Sohn, Xunyu Lin, and Honglak Lee. Learning to Generate Long-term Future via Hierarchical Prediction. InInt. Conf. Mach. Learn., 2017.
Bruce Walter, Stephen R. Marschner, Hongsong Li, and Kenneth E. Torrance. Microfacet Models for Refraction through Rough Surfaces. InACM EG, 2007.
Ting-Chun Wang, Ming-Yu Liu, Jun-Yan Zhu, Andrew Tao, Jan Kautz, and Bryan Catanzaro. High-Resolution Image Synthesis and Semantic Manipulation with Conditional GANs. InIEEE Conf. Comput. Vis. Pattern Recog., 2018.
Zhou Wang, Alan C Bovik, Hamid R Sheikh, and Eero P Simoncelli. Image Quality Assessment: from Error Visibility to Structural Similarity.IEEE Trans. Image Process., 2004.
Saining Xie, Chen Sun, Jonathan Huang, Zhuowen Tu, and Kevin Murphy. Rethinking Spatiotemporal Feature Learning: Speed-Accuracy Trade-offs in Video Classification. In Eur. Conf. Comput. Vis., 2018.
Fisher Yu, Yinda Zhang, Shuran Song, Ari Seff, and Jianxiong Xiao. LSUN: Construction of a Large-scale Image Dataset using Deep Learning with Humans in the Loop. arXiv:1506.03365, 2015.
Jinsong Zhang, Kalyan Sunkavalli, Yannick Hold-Geoffroy, Sunil Hadap, Jonathan Eisenman, and Jean-Francois Lalonde. All-Weather Deep Outdoor Lighting Estimation. In IEEE Conf. Comput. Vis. Pattern Recog., 2019.
Jun-Yan Zhu, Taesung Park, Phillip Isola, and Alexei A Efros. Unpaired Image-to-Image Translation using Cycle-Consistent Adversarial Networks. InInt. Conf. Comput. Vis., 2017.
Jun-Yan Zhu, Richard Zhang, Deepak Pathak, Trevor Darrell, Alexei A. Efros, Oliver Wang, and Eli Shechtman. Toward Multimodal Image-to-Image Translation. InAdv. Neural Inform. Process.

\* cited by examiner

INSERTING THREE-DIMENSIONAL OBJECTS INTO DIGITAL IMAGES WITH CONSISTENT LIGHTING VIA GLOBAL AND LOCAL LIGHTING INFORMATION

BACKGROUND

Advances in computer processing and machine learning have led to significant advancements in the field of digital image processing and rendering. Specifically, machine-learning models and neural networks provide many different types of systems the ability to process and render three-dimensional objects in digital images. For example, many systems utilize digital image processing and lighting estimation to modify digital images by inserting three-dimensional objects into the digital images or synthesizing the digital images with other digital images. Because lighting has such a significant impact on the realism of images, making sure that the lighting and shading of synthesized digital images are wholly consistent is an important but typically challenging task.

Some existing systems that synthesize digital images utilize regression loss in image color space and perceptual feature space to improve generated synthesized results relative to target synthesis results. Determining a regression loss in an unpaired image setting using the existing systems, however, is difficult because the corresponding target image is not available. Accordingly, existing systems typically lack flexibility because they are limited to operating under paired image settings. Furthermore, some existing systems attempt to overcome this issue by guiding an encoder of an image generator to have similar encoding between the two domains by adding a contrastive loss. The foregoing systems frequently add visual artifacts into the generated results, particularly when relationships between the two domains are difficult to capture based on the images (e.g., applying relevant shading just by referring to a background of an image).

Furthermore, some existing systems harmonize images by attempting to understanding the lighting details of a digital image from a background of the digital image. For instance, these existing systems harmonize a foreground object with a background by obtaining global information of the background from a neural network. Additionally, such systems utilize a domain verification discriminator to further improve image harmonization. Because these existing systems fail to utilize information about geometries of foreground objects during image harmonization, however, the systems inaccurately and inefficiently harmonize foreground objects with backgrounds when the object surfaces have complex shapes (e.g., a human face).

SUMMARY

This disclosure describes one or more embodiments of methods, non-transitory computer readable media, and systems that solve the foregoing problems (in addition to providing other benefits) by generating realistic shading for three-dimensional objects inserted into digital images. The disclosed systems utilize a light encoder neural network to generate a representation embedding of lighting in a digital image. Additionally, the disclosed systems ray-march from a camera position to the three-dimensional object to determine points of the three-dimensional object visible within a camera view. The disclosed systems then generate a self-occlusion map for the digital three-dimensional object by determining whether rays from the points intersect with the digital three-dimensional object. The disclosed systems utilize a generator neural network to determine a shading map for the digital three-dimensional object based on the representation embedding of lighting in the digital image and the self-occlusion map. Additionally, the disclosed systems generate a modified digital image with the three-dimensional object inserted into the digital image with consistent lighting of the three-dimensional object and the digital image. The disclosed systems improve the flexibility and accuracy of computing systems in digital image editing and harmonization.

BRIEF DESCRIPTION OF THE DRAWINGS

The detailed description refers to the drawings briefly described below.

DETAILED DESCRIPTION

Figure 1:
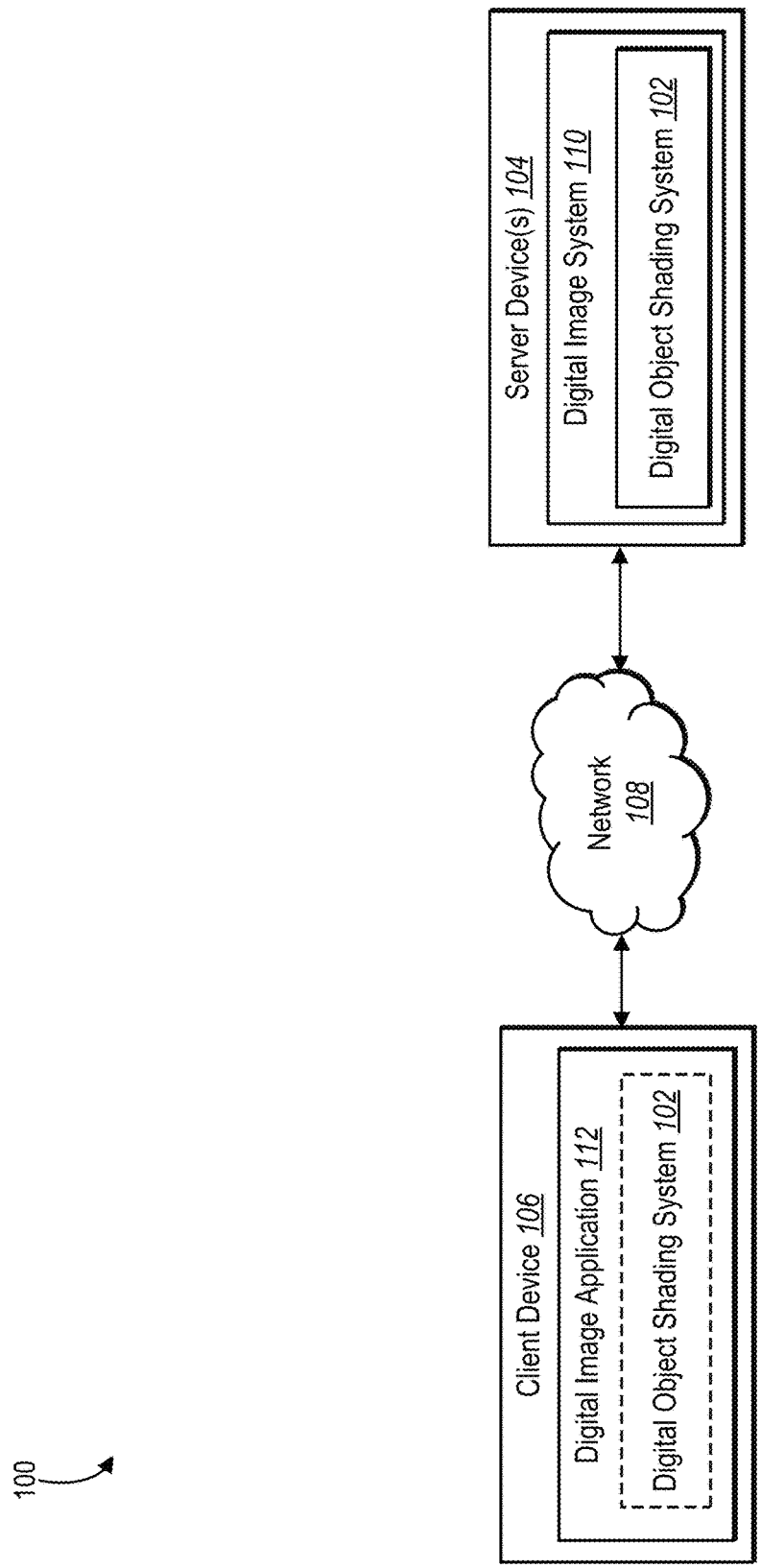
FIG. 1 illustrates a block diagram of a system environment in which digital object shading system is implemented in accordance with one or more implementations.

This disclosure describes one or more embodiments of a digital object shading system that improves computing systems that insert digital three-dimensional objects into digital images. Specifically, in one or more embodiments, the digital object shading system utilizes a light encoder neural network to extract a light source representation from a digital image (e.g., a digital image including a background). The digital object shading system also generates a self-occlusion map for a digital three-dimensional object being inserted into the digital image. For example, the digital object shading system detects, for a plurality of points on the object visible within a camera view in three-dimensional space, rays that hit the object. The digital object shading system generates a shading map based on the light source representation and an object representation including the self-occlusion map. Furthermore, the digital object shading system generates a modified digital image including the digital three-dimensional object inserted into the digital image with lighting based on the shading map.

As mentioned, in one or more embodiments, the digital object shading system generates a light source representation for a digital image in which the digital object shading system modifies by inserting a digital three-dimensional object. In particular, the digital object shading system utilizes a light encoder neural network to generate a light representation embedding for the digital image. More specifically, the digital object shading system utilizes the light encoder neural network to determine an embedding of at least one light source generating light and shadows in a digital image including a background.

Furthermore, in some embodiments, the digital object shading system learns parameters of the light encoder neural network using contrastive learning. For instance, the digital object shading system utilizes a first light encoder of the light encoder neural network to generate a first light representation embedding from a digital background image. The digital object shading system utilizes a second light encoder of the light encoder neural network to generate a second light representation embedding from ground-truth parameters associated with the digital background image. To illustrate, the digital object shading system utilizes the second light encoder to generate the second light representation embedding based on image-based lighting parameters and camera parameters of the digital background image. The digital object shading system then determines a contrastive loss based on the first light representation embedding and the second light representation embedding and utilizes the contrastive loss to improve the light encoder neural network.

In one or more embodiments, the digital object shading system generates a self-occlusion map for a digital three-dimensional object being inserted into a digital image. Specifically, the digital object shading system determines a plurality of points of the digital three-dimensional object visible by ray-marching from a camera position to the digital three-dimensional object. For each identified point of the digital three-dimensional object, the digital object shading system uniformly samples a fixed set of rays at equal angle intervals from the point and determines whether the rays intersect with any portion of the digital three-dimensional object. The digital object shading system generates a vector including values indicating whether the rays intersect with the digital three-dimensional object.

According to one or more embodiments, the digital object shading system utilizes a generator neural network to generate a shading map for a digital three-dimensional object. For example, the digital object shading system utilizes a generator neural network in a generative adversarial network including a discriminator network to generate shading maps based on lighting information for the digital image and a representation of the digital three-dimensional object. In particular, the digital object shading system extracts a normal map and an albedo map from the digital three-dimensional object. The digital object shading system then utilizes the generator neural network to generate the shading map from the normal map, the albedo map, the self-occlusion map, and the light representation embedding.

In one or more embodiments, the digital object shading system generates a modified digital image with a digital three-dimensional object inserted into a digital image including a background. Specifically, the digital object shading system utilizes a shading map generated by a generator neural network and additional information about the digital three-dimensional object to insert the digital three-dimensional object into the digital image with consistent lighting. For instance, the digital object shading system determines a digital mask for the digital three-dimensional object and synthesizes the shading map, the digital mask, and the albedo map to generate the modified digital mask.

In additional embodiments, the digital object shading system utilizes a modified digital image to improve an image processing model. For example, the digital object shading system determines a difference between the modified digital image generated based on the shading map of the generator neural network and a ground-truth modified digital image including the digital three-dimensional object. The digital object shading system determines a loss based on the difference between the modified digital image and the ground-truth digital image and uses the loss to learn parameters of a segmentation machine-learning model, for example. In some embodiments, the digital object shading system uses the segmentation machine-learning model including the learned parameters to segment digital objects in digital images.

The disclosed digital object shading system provides a number of benefits over conventional systems. For example, the digital object shading system improves flexibility relative to existing systems that utilize computing devices to modify digital images with digital three-dimensional objects. In contrast to existing systems that lack flexibility and accuracy in unpaired image settings, the digital object shading system utilizes global and local information about digital three-dimensional objects and digital images to provide accurate image synthesizing of realistic shading in both paired and unpaired settings. Specifically, by utilizing self-occlusion of three-dimensional objects inserted into digital images to generate a shading map, the digital object shading system provides consistent shading of objects relative to the corresponding digital images by accounting for shadows caused by the objects themselves.

Furthermore, the digital object shading system improves accuracy of computing devices that modify digital images with digital three-dimensional objects. In particular, by utilizing local geometric information about digital three-dimensional objects inserted into digital images to determine realistic shading for the objects relative to backgrounds of digital images. More specifically, by providing a surface normal map and a self-occlusion map of a digital three-dimensional object to a generator neural network, the digital object shading system more accurately determines a relationship between the color space and the perceptual feature space. Indeed, the digital object shading system more accurately determines lighting details of the digital three-dimensional object consistent to lighting of a background of a digital image.

Additionally, the digital object shading system more accurately learns lighting of the background image via contrastive learning of light representation embeddings generated by a light encoder neural network. Specifically, the digital object shading system utilizes deep learning to generate a first set of light representation embeddings based on digital images and a second set of light representation embeddings based on ground-truth parameters of the digital images. By utilizing contrastive learning, the digital object shading system ensures that the light encoder neural network accurately determines light representations based only on the digital images (e.g., based on lighting of backgrounds in the digital images).

As illustrated by the foregoing discussion, the present disclosure utilizes a variety of terms to describe features and advantages of the digital object shading system. Additional detail is now provided regarding the meaning of such terms. For example, as used herein, the term "digital image" refers to a computer representation of a scene. In one or more embodiments, a digital image includes an image file depicting a background scene. Additionally, in one or more embodiments, a digital image includes a video frame in a digital video. Accordingly, a digital video includes a plurality of digital images.

As used herein, the terms "digital three-dimensional object" and "three-dimensional object" refer to a computer model representing an object in three-dimensional space. In other words, a digital three-dimensional object, in one or more embodiments, comprises a virtual or computer-generated object. In one or more embodiments, a three-dimensional object includes a mesh including a plurality of points (e.g., "vertices") connected together to form one or more surfaces to which one or more textures are applied. To illustrate, in one or more embodiments, a three-dimensional object includes a synthetic 3D human character, animal, or other graphical object created using a computer.

Additionally, as used herein, the term "three-dimensional space" refers to a coordinate space including three dimensions. For instance, a three-dimensional space includes three separate axes. Accordingly, models constructed or stored in a three-dimensional space include a plurality of points corresponding to coordinates within the three-dimensional space. In various embodiments, points in a three-dimensional include coordinates with positions relative to an origin point such as an origin point of a three-dimensional object or an origin point in a three-dimensional space. In alternative embodiments, points in a three-dimensional model include coordinates with positions relative to each other.

As used herein, the term "camera position" refers to a coordinate position of a camera within a three-dimensional space. For example, a camera position includes a set of three-dimensional coordinates that indicates a location of a camera relative to one or more objects in the three-dimensional space. In one or more additional embodiments, the term "camera view" refers to direction parameters of a camera within a three-dimensional space. For instance, a camera view indicates a direction and a field of view (e.g., viewing angle, size of visible area) of a camera within a three-dimensional space.

Additionally, as used herein, the term "ray" refers to a sampled path traced within a three-dimensional space. For example, a rendering engine or other computer processing component traces a path from a first point to a second point. Accordingly, in one or more embodiments, a ray includes a path traced from a camera position through a three-dimensional space to determine whether the ray contacts any objects within the three-dimensional space. In one or more embodiments, a ray includes a path traced from a point of a three-dimensional object through a three-dimensional space to determine whether the path intersects (e.g., hits) another portion of the three-dimensional object.

As used herein, the term "light representation embedding" refers to an abstract representation of lighting of a digital image. For example, a light representation embedding includes a feature map or collection of feature vectors including abstracted values representing lighting in a digital image. In one or more embodiments, a light representation embedding includes a feature map generated by a neural network such as a light encoder neural network. For example, a light representation embedding, in one or more embodiments, comprises a h×w×d feature map, where h is the height of an image in pixel, w is the width of the image in pixel and d is a number of dimensions or channels. As a non-limiting example, in one or more embodiments a light representation embedding comprises a 128×128×16 feature map.

Also as used herein, the term "neural network" includes a computer representation that is tuned (e.g., trained) based on inputs to approximate unknown functions. In particular, a neural network includes one or more layers (i.e., artificial neurons) that utilize algorithms to learn from, and make predictions on, known data by analyzing the known data to learn to generate outputs that reflect patterns and attributes of the known data. For example, a neural network makes high-level abstractions in data by generating data-driven predictions or decisions from the known input data. In some embodiments, a neural network includes, but is not limited to, a convolutional neural network, a recurrent neural network, a residual neural network, or an adversarial neural network. For example, a light encoder neural network includes a convolutional neural network (or convolutional layer(s)). In one or more embodiments, a generator neural network includes a residual neural network in an adversarial neural network. In one or more additional embodiments, a discriminator neural network includes one or more neural network layers in an adversarial neural network with the generator neural network.

As used herein, the term "self-occlusion map" refers to a set of values representing self-shadowing of a three-dimensional object. For instance, a self-occlusion map includes one or more vectors including values indicating whether a plurality of rays from points in a three-dimensional object intersect (or hit) one or more other portions of the three-dimensional object. To illustrate, a self-occlusion map includes a plurality of Boolean values corresponding to a plurality of rays for a plurality of points in a three-dimensional object. In other embodiments, a self-occlusion map includes other value types such as a float value.

As used herein, the term "normal map" refers to a representation of normal values for a plurality of points in a three-dimensional model. To illustrate, a normal map includes normal directions for pixels in an image based on a plurality of vertices (e.g., points) in a three-dimensional mesh in three-dimensional space. In some embodiments, a normal map includes normal directions for all surfaces in a three-dimensional object based on faces or subsets of faces in a three-dimensional object. Furthermore, in some embodiments, a normal map stores a surface slope/curvature of the three-dimensional mesh at each point in the mesh.

As used herein, the term "albedo map" refers to a representation of albedo values for a three-dimensional object. In one or more embodiments, an albedo map includes an image texture map that maps one or more base color values to portions of a three-dimensional object. Specifically, an albedo map includes color values (e.g., RGB) for regions of a three-dimensional object that includes reflectance values for certain types of materials (e.g., metals) and diffuse reflected values for other types of materials (e.g., dielectrics). Accordingly, an albedo map may exclude some or all shading values corresponding to the portions of the three-dimensional object.

Turning now to the figures, FIG. 1 includes an embodiment of a system environment 100 in which a digital object shading system 102 operates. In particular, the system environment 100 includes server device(s) 104 and a client device 106 in communication via a network 108. Moreover, as shown, the server device(s) 104 include a digital image system 110, which includes the digital object shading system 102. Additionally, the client device 106 includes a digital image application 112, which optionally includes the digital object shading system 102.

As shown in FIG. 1, the server device(s) 104 includes or hosts the digital image system 110. Specifically, the digital image system 110 includes, or is part of, one or more systems that implement digital image processing. For example, the digital image system 110 provides tools for viewing, generating, editing, and/or otherwise interacting with digital images (e.g., via the digital image application 112 of the client device 106). In one or more embodiments, the digital image system 110 processes digital content items including digital images and/or digital videos. To illustrate, the digital image system 110 utilizes machine-learning models or neural networks to generate and/or modify digital image. In one or more embodiments, the digital image system 110 generates datasets of synthetic digital images or digital videos in connection with training neural networks or machine-learning models (e.g., segmentation machine-learning models). In one or more additional embodiments, the digital image system processes digital images in connection with one or more additional systems such as cloud-storage systems.

In connection with generating or modifying digital images, the digital image system 110 includes the digital object shading system 102 to process digital images by inserting digital three-dimensional objects into digital images. In particular, the digital object shading system 102 extracts information from digital images and three-dimensional objects. For instance, the digital object shading system 102 extracts a self-occlusion map from a three-dimensional object being inserted into a digital image via a representation that improves modeling of complex illumination effects on the three-dimensional object. More specifically, the digital object shading system 102 generates the self-occlusion map to account for shadows on the three-dimensional object caused by other parts of the three-dimensional object in connection with light estimated from the digital image.

In one or more embodiments, the digital object shading system 102 generates a shading map for modifying a digital image utilizes shading information associated with a three-dimensional object in connection with light information extracted from a digital image using deep learning. Specifically, the digital object shading system 102 utilizes a light encoder neural network to generate representations of one or more light sources in digital images. Furthermore, in some embodiments, the digital object shading system 102 learns parameters of the light encoder neural network utilizing contrastive learning based on differences between light representation embeddings from digital images including backgrounds and ground-truth parameters for the digital images. The digital object shading system 102 then utilizes a generator neural network to generate the shading map based on a self-occlusion map of a three-dimensional object and a light representation embedding of a digital image.

Additionally, in one or more embodiments, the digital object shading system 102 generates a modified digital image including a three-dimensional object. For instance, the digital object shading system 102 inserts the three-dimensional object within the digital image utilizing an extracted light representation for the digital image and self-occlusion information for the three-dimensional object. Furthermore, after generating a modified digital image, the digital object shading system 102 (or the digital image system 110) provides the modified digital image to the client device 106 via the network 108. In some embodiments, the digital image system 110 combines the modified digital image with a plurality of additional modified digital images such as in a digital video including a plurality of video frames.

In one or more embodiments, the server device(s) 104 include a variety of computing devices, including those described below with reference to FIG. 11. For example, the server device(s) 104 includes one or more servers for storing and processing data associated with digital images and three-dimensional models. In some embodiments, the server device(s) 104 also include a plurality of computing devices in communication with each other, such as in a distributed storage environment. In some embodiments, the server device(s) 104 include a content server. The server device(s) 104 alternatively also include an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 11. Furthermore, although not shown in FIG. 1, the client device 106 is operable by a user (e.g., a user included in, or associated with, the system environment 100) to perform a variety of functions. In particular, the client device 106 performs functions such as, but not limited to, accessing, generating, viewing, modifying, and otherwise interacting with a digital image and/or a three-dimensional model via the digital image application 112. The client device 106 also performs functions for generating, capturing, or accessing data to provide to the digital image system 110 and the digital object shading system 102 in connection with generating and modifying digital images. For example, the client device 106 communicates with the server device(s) 104 via the network 108 to provide digital images and/or three-dimensional models to the server device(s) 104. Although FIG. 1 illustrates the system environment 100 with a single client device 106, the system environment 100 has the ability to include a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 includes one or more various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 11.

Although FIG. 1 illustrates the server device(s) 104 and the client device 106 communicating via the network 108, in alternative embodiments, the various components of the digital object shading system 102 communicate and/or interact via other methods (e.g., the server device(s) 104 and the client device 106 communicate directly). Furthermore, although FIG. 1 illustrates the digital object shading system 102 being implemented by a particular component and/or device within the system environment 100, the digital object shading system 102 optionally is implemented, in whole or in part, by other computing devices and/or components in the system environment 100 (e.g., the client device 106). Additionally, the server device(s) 104 and/or the client device 106 may access digital images or three-dimensional objects from a third-party system via the network 108.

Figure 2:
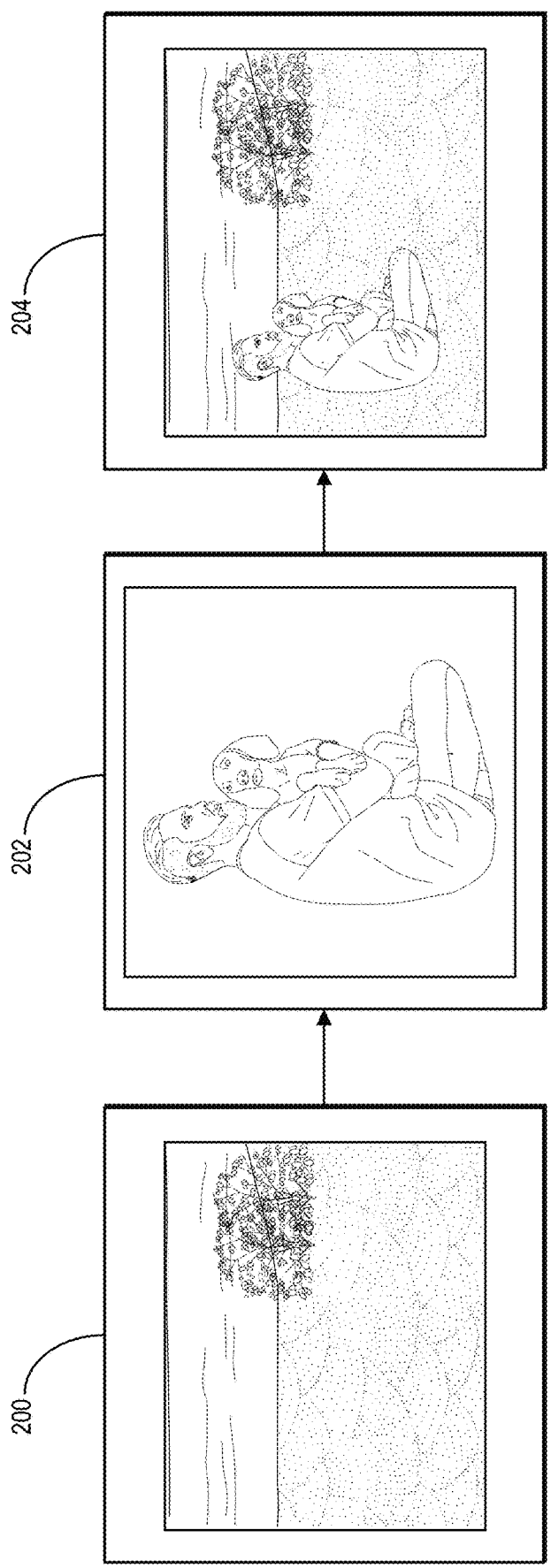
FIG. 2 illustrates a diagram of a process for inserting a digital three-dimensional object into a digital image in accordance with one or more implementations.

In one or more embodiments, the digital object shading system 102 flexibly and accurately modifies digital images by inserting three-dimensional objects into the digital images with consistent lighting for the digital images and three-dimensional objects. FIG. 2 illustrates an overview diagram for modifying a digital image by inserting a three-dimensional object into the digital image. In particular, FIG. 2 illustrates that the digital object shading system 102 inserts a model of a three-dimensional object into a particular position within a digital image with lighting of the three-dimensional object consistent with the digital image.

As mentioned, FIG. 2 illustrates a digital image 200 including a background. For instance, the digital image 200 includes a view of a landscape or other scene. In one or more embodiments, the digital image 200 includes a photograph or a computer-generated image. Additionally, in some embodiments, the digital image 200 includes objects or other visual elements that cast shadows or otherwise indicate lighting within the scene caused by one or more light sources—e.g., the sun, light bulbs.

According to one or more embodiments, the digital object shading system 102 receives a request to insert a three-dimensional object 202 into the digital image 200. Specifically, the digital object shading system 102 receives a request to insert a three-dimensional model of an object into the digital image 200 at a specific location. FIG. 2 illustrates that the three-dimensional object 202 includes a human object or another object including complex geometry.

Based on the request to insert the three-dimensional object 202 into the digital image 200, the digital object shading system 102 generates a modified digital image 204. In one or more embodiments, the digital object shading system 102 inserts the three-dimensional object 202 into the digital image at a specific position with lighting consistent with the digital image 200. In particular, the digital object shading system 102 utilizes a light encoder neural network to extract lighting information (i.e., a light representation embedding) from the digital image 200. The digital object shading system 102 also determines local shading information for the three-dimensional object 202. In particular, the digital object shading system 102 generates a self-occlusion map indicating one or more portions of the three-dimensional object 202 that affect shading on other portions of the three-dimensional object 202 based on the position of the three-dimensional object 202 in the modified digital image 204 and the lighting information extracted from the digital image 200. The digital object shading system 102 then utilizes the self-occlusion map and the light representation embedding to light and shade the three-dimensional object 202 in a manner consistent with the digital image 200, as explained in greater detail below.

Figure 3:
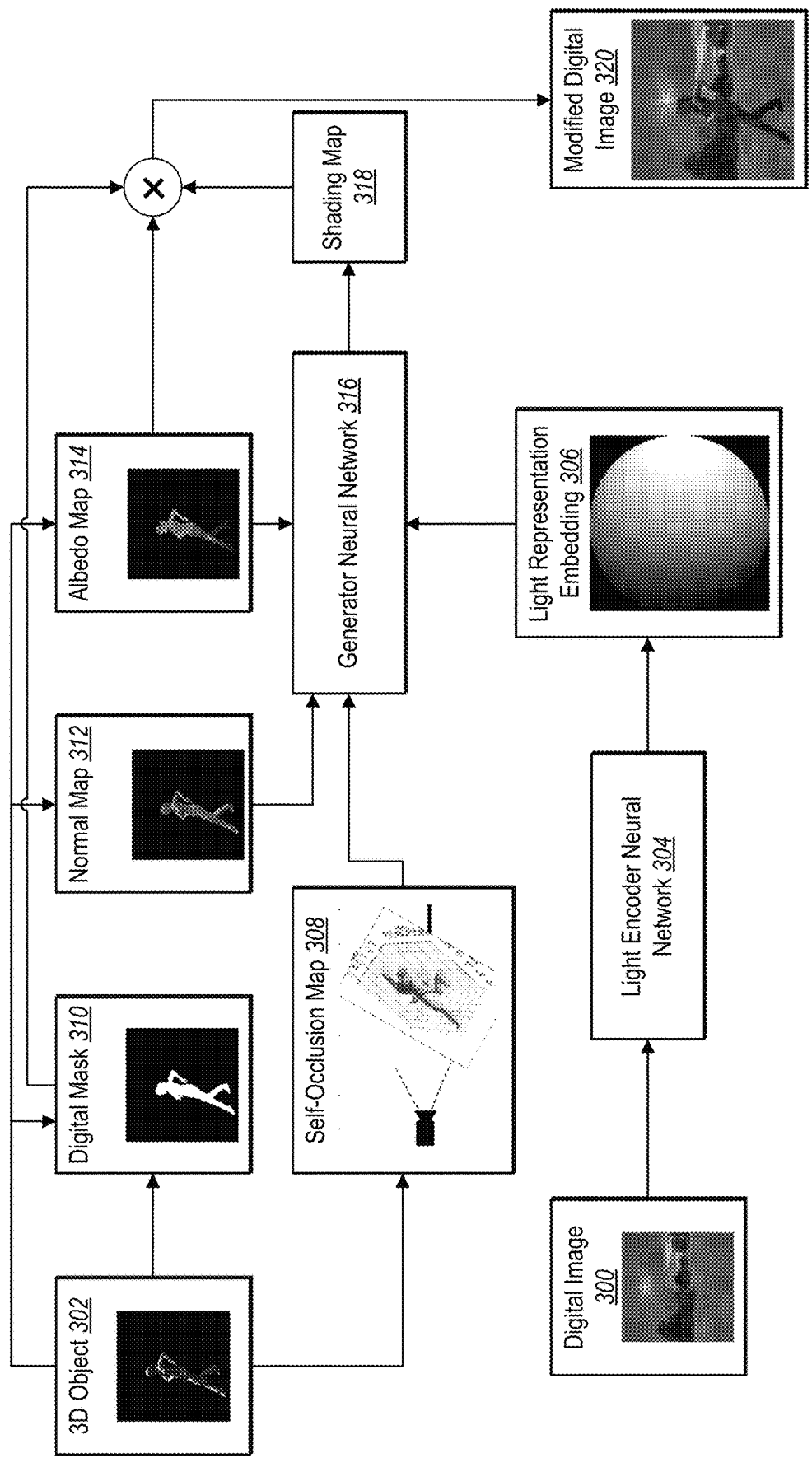
FIG. 3 illustrates a diagram of an overview of the digital object shading system modifying a digital image by inserting a three-dimensional object in accordance with one or more implementations.

FIG. 3 illustrates additional detail associated with the process for generating a modified digital image by inserting a three-dimensional object into a digital image. As illustrated in FIG. 3, the digital object shading system 102 receives a request to modify a digital image 300 by inserting a three-dimensional object ("3D object 302") into the digital image 300. In one or more embodiments, the digital object shading system 102 determines light information from the digital image 300 via a light encoder neural network 304. Specifically, the digital object shading system 102 generates a light representation embedding 306 that represents one or more light sources by processing the digital image 300 utilizing the light encoder neural network 304. For example, the light representation embedding 306 includes an abstracted representation—such as a feature map—that includes information about the positioning, direction, strength, color, or other parameters of the lighting in the digital image 300. In some embodiments, the light representation embedding 306 includes a plurality of feature maps.

FIG. 3 further illustrates that the digital object shading system 102 generates a self-occlusion map 308 for the 3D object 302. In particular, the digital object shading system 102 generates the self-occlusion map 308 by determining one or more portions of the 3D object 302 that occlude one or more other portions of the 3D object 302. More specifically, the digital object shading system 102 determines a plurality of points of the 3D object 302 visible within a rendering perspective based on a camera position and camera view of a camera within three-dimensional space. Additionally, for each of the points of the 3D object 302, the digital object shading system 102 samples a plurality of rays directed from the corresponding point to determine whether the rays intersect (e.g., hit) any other portion of the 3D object 302. The digital object shading system 102 then stores the values for the sampled rays for each point within the self-occlusion map 308.

Furthermore, FIG. 3 illustrates that the digital object shading system 102 processes the 3D object 302 to determine visual attributes of the 3D object 302. In particular, the digital object shading system 102 generates a digital mask 310 of the 3D object 302 for use with inserting the 3D object 302 into the digital image 300. For instance, the digital mask 310 includes a foreground mask indicating a shape of the 3D object 302 relative to the digital image 300. In some embodiments, the digital mask 310 includes an alpha mask with values indicating whether each pixel of a plurality of pixels correspond (or partially correspond) to the 3D object 302.

As further illustrated in FIG. 3, the digital object shading system 102 also generates a normal map 312 of the 3D object 302. Specifically, the digital object shading system 102 generates the normal map 312 by determining a plurality of normal values for points of the 3D object 302. To illustrate, the digital object shading system 102 determines normal directions for portions of the 3D object 302 based on the position and shape of visible portions of the 3D object 302 relative to the rendering perspective based on the camera position and the camera view. The digital object shading system 102 then generates the normal map 312 by determining and storing a surface slope of the 3D object 302 for each of a plurality of pixels based on a rendering resolution according to the rendering perspective.

In additional embodiments, as illustrated in FIG. 3, the digital object shading system 102 generates an albedo map 314 for the 3D object 302. For instance, the digital object shading system 102 determines base color values of the 3D object 302 and stores the base color values within the albedo map 314. To illustrate, the digital object shading system 102 determines the base color values of visible portions of the 3D object 302 from the rendering perspective according to the camera position and camera view. Additionally, the digital object shading system 102 determines the color values associated with each portion of the 3D object 302 for each of a plurality of pixels from the rendering perspective based on a rendering resolution.

After determining a representation of the 3D object 302, FIG. 3 illustrates that the digital object shading system 102 utilizes a generator neural network 316 to generate a shading map 318. For example, the digital object shading system 102 utilizes the generator neural network 316 to determine accurate color values for a plurality of pixels according to the rendering perspective based on color, curvature, and shading information in the representation of the 3D object 302. To illustrate, the digital object shading system 102 utilizes the generator neural network 316 to generate the shading map utilizing the self-occlusion map 308, the normal map 312, and the albedo map 314 as inputs to the generator neural network 316.

As illustrated in FIG. 3, after generating the shading map 318, the digital object shading system 102 generates a modified digital image 320. Specifically, the digital object shading system 102 utilizes the shading information and additional information from the representation of the 3D object 302 to generate the modified digital image 320. For instance, the digital object shading system 102 synthesizes the modified digital image 320 from the digital mask 310, the albedo map 314, and the shading map 318. In some embodiments, the digital object shading system 102 utilizes a multiplication operation to multiply values in the digital mask 310, the albedo map 314, and the shading map 318 to generate the color values of pixels corresponding to the 3D object 302 inserted into the digital image 300. By utilizing the lighting and shading information associated with the digital image 300 and the 3D object 302 to generate the modified digital image 320, the digital object shading system 102 ensures that the lighting of the digital image 300 and 3D object 302 are consistent.

Figure 4A:
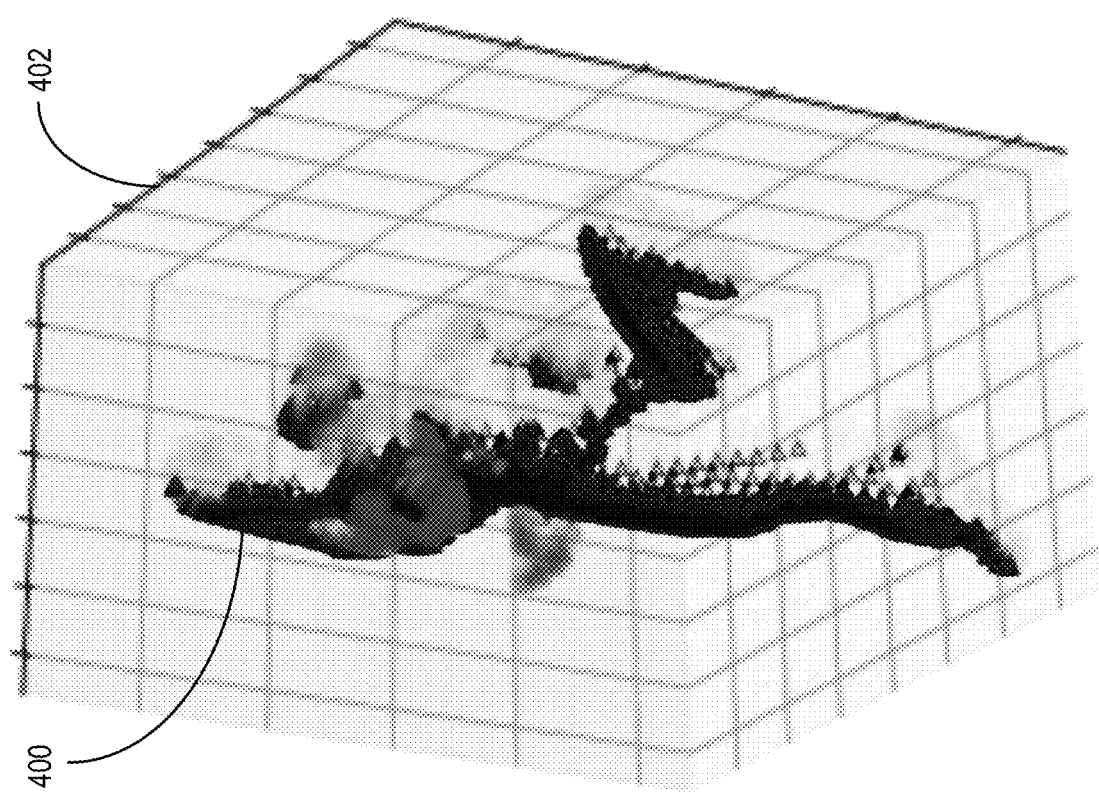
FIGS. 4A-4C illustrate diagrams of a process for generating a self-occlusion map for a three-dimensional object in accordance with one or more implementations.
Figure 4B:
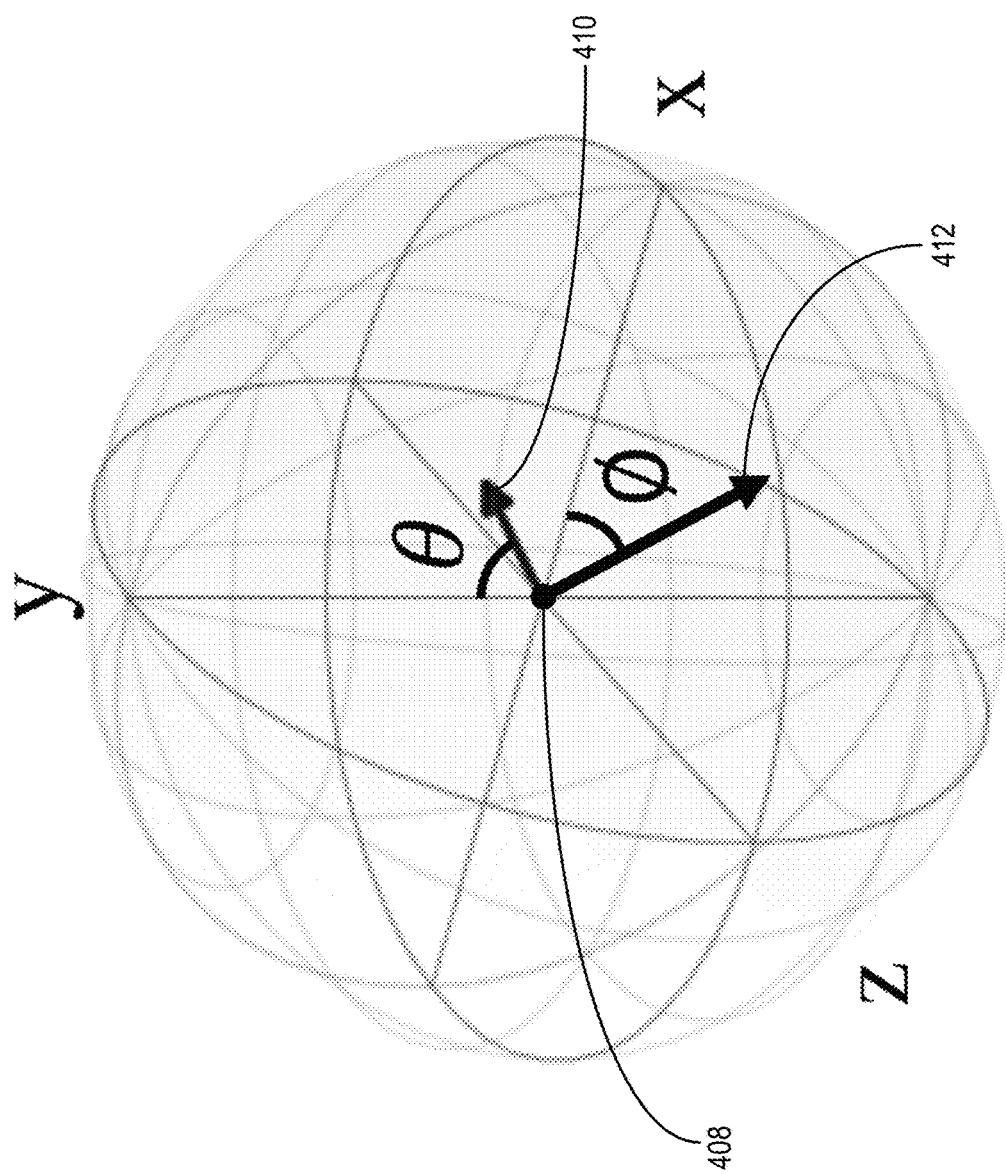
Figure 4C:
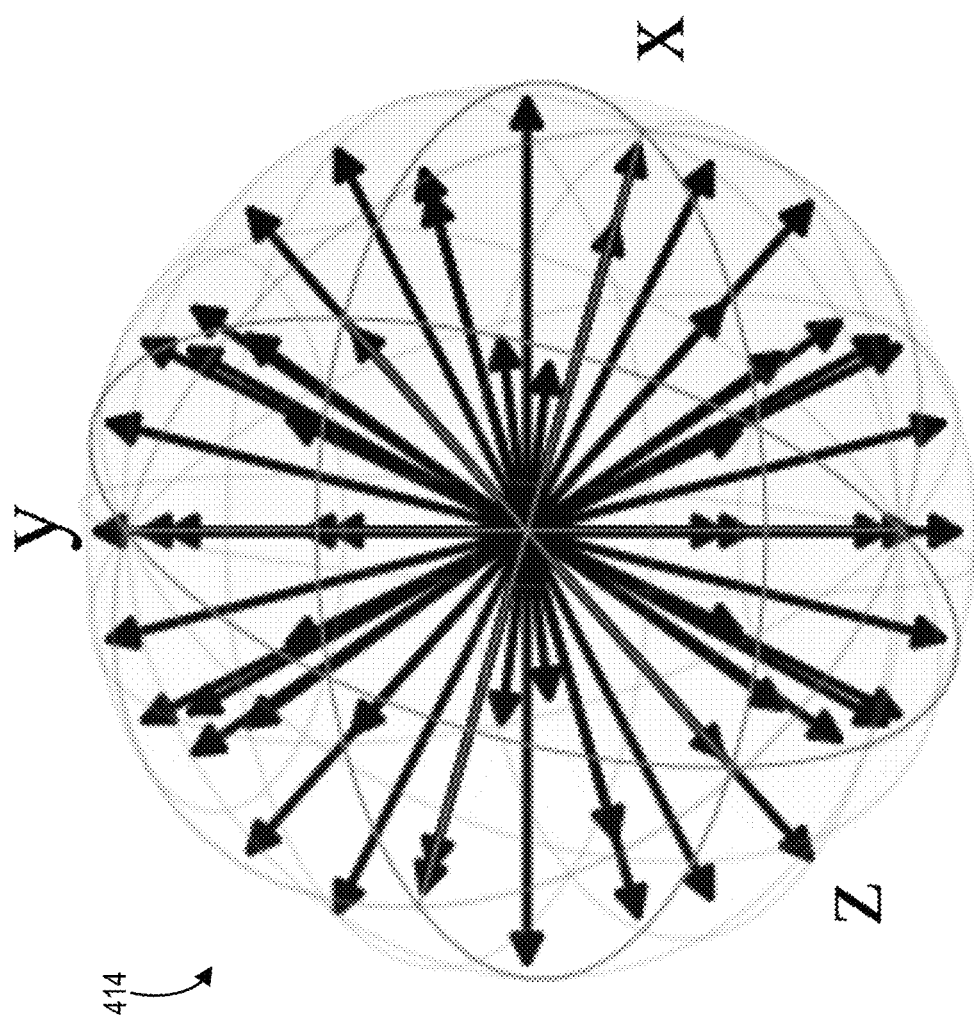

As mentioned, in connection with generating a modified digital image by inserting a three-dimensional object into a digital image, the digital object shading system 102 generates a self-occlusion map for the three-dimensional object. FIGS. 4A-4C illustrate a plurality of diagrams including various operations for generating a self-occlusion map. In particular, FIG. 4A illustrates a diagram of a portion of a three-dimensional object determined by ray-marching from a camera position in three-dimensional space. FIG. 4B illustrates a diagram for initiating a process of sampling angles around a point identified by ray-marching from a camera position in three-dimensional space. FIG. 4C illustrates a set of sampled rays for the point of the three-dimensional object.

As illustrated in FIG. 4A, the digital object shading system 102 determines one or more portions or surfaces of a three-dimensional object 400 in a three-dimensional space 402 according to a rendering perspective of a camera 404. For example, the three-dimensional object 400 includes a mesh with a plurality of vertices at a plurality of coordinates and a plurality of edges connecting the vertices in the three-dimensional space 402. Additionally, in one or more embodiments, the mesh of the three-dimensional object 400 includes a plurality of faces or surfaces formed by the plurality of vertices and the plurality of edges.

In one or more embodiments, the digital object shading system 102 determines parameters corresponding to a camera 404 within a three-dimensional space 402. For instance, the camera 404 includes a camera object within the three-dimensional space 402 and is associated with a plurality of camera parameters that determine the rendering perspective. To illustrate, the digital object shading system 102 determines a field of view 406 associated with the camera 404 based on camera parameters such as, but not limited to, a position, a viewing distance, a viewing direction, a camera/view size, and a camera type of the camera 404. The digital object shading system 102 thus determines camera parameters that indicate one or more portions of the three-dimensional object 400 that are visible from the rendering perspective.

Based on the position of the three-dimensional object 400 and the camera parameters of the camera 404 within the three-dimensional space 402, the digital object shading system 102 determines a plurality of points of the three-dimensional object 400. In particular, the digital object shading system 102 utilizes ray-marching from the camera 404 (according to the camera parameters) to determine whether specific vertices in a mesh corresponding to the three-dimensional object 400 are visible within the field of view 406. For example, vertices that are obscured (or hidden from view) from the perspective of the camera 404 are not detected during the ray-marching process. In one or more embodiments, the digital object shading system 102 stores the detected vertices in computer memory.

In one or more embodiments, after determining a plurality of points of the three-dimensional object 400, the digital object shading system 102 samples a set of rays for the plurality of points. In particular, FIG. 4B illustrates that the digital object shading system 102 initiates a process to sample a plurality of rays for a point 408. For example, the digital object shading system 102 selects the point 408 from the plurality of points identified from the three-dimensional object 400. As shown, the digital object shading system 102 samples a first ray 410 at a particular angle from the point 408.

To illustrate, the digital object shading system 102 samples the first ray 410 from the point 408 in a predetermined direction. In one or more embodiments, the digital object shading system 102 samples the first ray 410 in a first direction relative to a coordinate system of a three-dimensional space in which the three-dimensional object is located. Alternatively, the digital object shading system 102 samples the first ray 410 at a first direction relative to one or more other points in the three-dimensional object or relative to a camera space (e.g., a rendering perspective based on a camera view).

Furthermore, FIG. 4B illustrates that the digital object shading system 102 samples a second ray 412. To illustrate, the digital object shading system 102 determines second direction by rotating one or more angles (e.g., $\theta$ and $\phi$) by a specific amount from the first direction of the first ray 410. The digital object shading system 102 then samples the second ray 412 from the point 408 in the second direction.

In one or more embodiments, the digital object shading system 102 continues sampling rays from the point 408 until the digital object shading system 102 has sampled a plurality of rays. In particular, FIG. 4C illustrates a set of rays 414 including a predetermined number of rays. More specifically, the digital object shading system 102 samples the set of rays 414 by rotating the one or more angles and sampling rays until returning to the first direction of the first ray 410 illustrated in FIG. 4B. In some embodiments, the digital object shading system 102 rotates the angles θ and φ in by 30 degrees for each sampled ray and obtains a total of 62 sampled rays. In one or more embodiments, the digital object shading system 102 samples the number of rays based on a computer architecture to limit the resources for storing sampled sets of rays for individual points of a three-dimensional object. In other embodiments, the digital object shading system 102 samples more or fewer sets of rays for individual points in a three-dimensional object.

In some embodiments, the digital object shading system 102 determines whether each ray of the set of rays 414 intersects another portion of the three-dimensional object. For instance, the digital object shading system 102 traces each ray of the set of rays 414 and stores a value indicating whether the ray hits the three-dimensional object (e.g., one or more surfaces of the three-dimensional object). To illustrate, the digital object shading system 102 stores a Boolean value (e.g., a 0 or 1) indicating that the ray did hit or did not hit another portion of the three-dimensional object. Alternatively, the digital object shading system 102 stores a float value indicating whether a ray hit or did not hit another portion of the three-dimensional object.

In one or more embodiments, the digital object shading system 102 stores the values for the point 408 within a vector (e.g., a Boolean vector). According to at least some embodiments, the digital object shading system 102 stores the values for rays corresponding to all identified points within a shading map including a single vector or a plurality of vectors (e.g., a separate vector for each point). To generate a shading map for a visible portion of a three-dimensional object within a rendered perspective, the digital object shading system 102 provides the vector of values in a self-occlusion map to a generator neural network.

Figure 5:
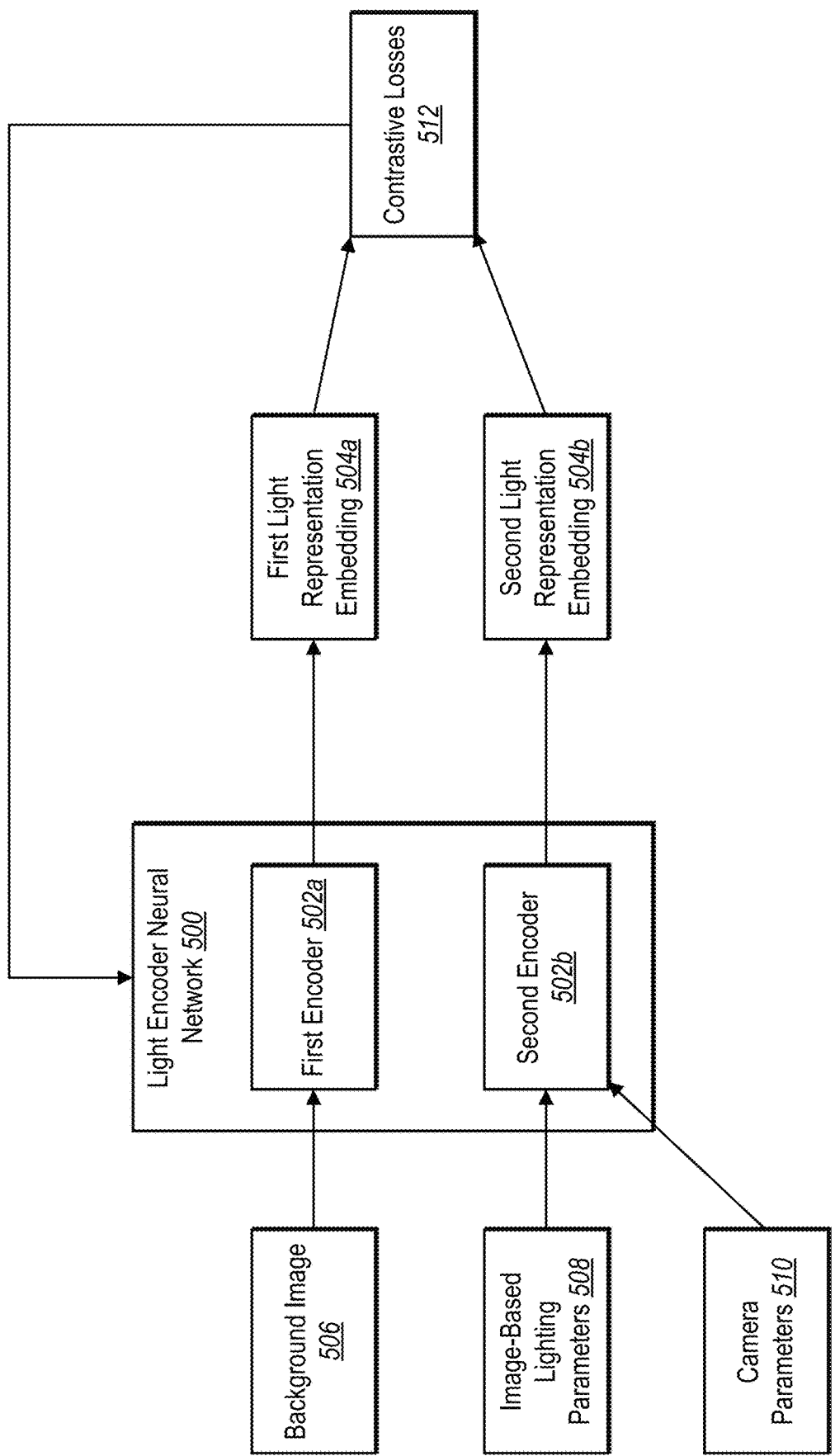
FIG. 5 illustrates a diagram of the digital object shading system determining a contrastive loss for a light encoder neural network in accordance with one or more implementations.

As mentioned, in one or more embodiments, the digital object shading system 102 utilizes a neural network to generate representations of lighting in a digital image. FIG. 5 illustrates that the digital object shading system 102 utilizes a light encoder neural network 500 to generate light representation embeddings to represent light sources from information about a digital image. Additionally, FIG. 5 illustrates that the digital object shading system 102 utilizes light representation embeddings to improve the performance of the light encoder neural network 500 via a loss associated with the light representation embeddings.

As illustrated in FIG. 5, the digital object shading system 102 utilizes a first encoder 502a of the light encoder neural network 500 to generate a first light representation embedding 504a from a background image 506. To illustrate, the digital object shading system 102 utilizes a plurality of digital images in a dataset including synthetic images generated by a physically-based renderer. In other embodiments, the digital object shading system 102 utilizes a plurality of digital images in a combination of photographs and synthetic images. In one or more embodiments, the background image 506 includes a scene into which the digital object shading system 102 inserts one or more objects into a foreground region in front of the scene.

In one or more embodiments, the first encoder 502a includes a first instance of the light encoder neural network 500 or a first set of layers within the light encoder neural network 500. Accordingly, the digital object shading system 102 utilizes the first encoder 502a to determine (e.g., predict) a representation of lighting in the background image 506. For instance, the digital object shading system 102 utilizes the first encoder 502a to recover an image-based lighting representation corresponding to the background image 506.

In addition to generating the first light representation embedding 504a utilizing the first encoder 502a, the digital object shading system 102 utilizes a second encoder 502b to generate a second light representation embedding 504b. In one or more embodiments, the digital object shading system 102 determines configuration parameters associated with the background image 506. More specifically, the digital object shading system 102 determines ground-truth lighting parameters such as image-based lighting parameters 508 and camera parameters 510 of the background image 506. For instance, the digital object shading system 102 determines the image-based lighting parameters 508 including a representation of the image-based lighting used to render the background image 506. In addition, the digital object shading system 102 determines the camera parameters 510 used to render the background image 506. In one or more embodiments, the digital object shading system 102 obtains the ground-truth lighting parameters based on data used to generate synthetic images including the background image 506 (e.g., from an image generation application or system).

In one or more embodiments, the digital object shading system 102 utilizes the generated light representation embeddings to learn parameters of the light encoder neural network 500. In particular, the digital object shading system 102 determines a difference between the first light representation embedding 504a and the second light representation embedding 504b to generate contrastive losses 512. The digital object shading system 102 then utilizes the contrastive losses 512 to learn the parameters of the light encoder neural network 500 and reduce the difference between the first light representation embedding 504a and the second light representation embedding 504b. At inference time, the digital object shading system 102 utilizes only light representation embeddings generated directly from the digital images (e.g., via the first encoder 502a).

In one or more embodiments, the digital object shading system 102 utilizes the light encoder neural network 500 to generate light representation embeddings for a background image $x_b^j$. Each background image $x_b^j$ includes a ground-truth image-based lighting configuration $x_h^j$ represented by an eight-dimensional one-hot vector and a ground-truth 4×4 camera matrix parameter $x_m^j$. Additionally, the digital object shading system 102 trains and uses two encoders—a first encoder $f_b$ that extracts a light representation embedding from the background image as $l_b^j = f_b(x_b^j)$ and a second encoder $f_c$ that extracts a light representation embedding from the ground-truth lighting parameters as $l_c^j = f_c(x_h^j, x_m^j)$.

In one or more embodiments, the digital object shading system 102 utilizes contrastive learning to ensure that the light embeddings $l_b^j$ and $l_c^j$ are similar. Specifically, for each $(l_b^j, l_c^j)$, the digital object shading system 102 defines positive samples $l_c^{j+}$ that are expected to have similar light embeddings regardless of slight changes in camera parameters (e.g., within the same video clip). The digital object shading system 102 also defines negative samples $l_c^{j-}$ that come from different image-based lighting configurations and are thus expected to have different light representation embeddings. Accordingly, the digital object shading system 102 trains the encoders $f_c$ and $f_b$ by using two contrastive losses—a first loss for light representation embeddings extracted from $f_c$ and a second loss for light representation embeddings extracted from $f_c$ and $f_b$. In particular, the losses are represented as:

$$\ell_i^j = -\log\left[\frac{e^{\frac{1}{\tau}\Sigma_{j+}\|l_c^j - l_c^{j+}\|_2}}{\left(e^{\frac{1}{\tau}\Sigma_{j+}\|l_c^j - l_c^{j+}\|_2} + e^{\frac{1}{\tau}\Sigma_{j-}\|l_c^j - l_c^{j-}\|_2}\right)}\right] -$$

-continued $$\log\left[\frac{e^{\frac{1}{\tau}\Sigma_{j+}\|l_b^j - l_c^{j+}\|_2}}{\left(e^{\frac{1}{\tau}\Sigma_{j+}\|l_b^j - l_c^{j+}\|_2} + e^{\frac{1}{\tau}\Sigma_{j-}\|l_b^j - l_c^{j-}\|_2}\right)}\right]$$

in which $[\cdot]$ stands for a stop gradient, $\|\cdot\|_2$ stands for the $\ell_2$ distance, and $\tau$ is a constant value (0.007) for temperature. Based on the contrastive loss, the light representation embeddings $l_b^j$ and $l_c^j$ extracted from the background image and the corresponding configuration parameters become similar.

In one or more embodiments, the light encoder neural network 500 includes a plurality of convolutional layers and transposed convolutional layers. Additionally, in one or more embodiments, each convolutional layer is followed by instance normalization and leaky rectified linear unit non-linearity. Furthermore, in one or more embodiments, the transposed convolutional layers are unbiased. The digital object shading system 102 also performs reflection padding before each layer, not to reduce the activation shape by 1 pixel on each side. Table A below illustrates an example architecture for the encoder to generate embeddings from ground-truth lighting parameters.

TABLE A

Network architecture for $f_c$

| Layer | Activation Shape |
|---|---|
| Input | 1 × 1 × 24 |
| 4 × 4 × 16 TransConv. stride 4 (no norm, linear) | 4 × 4 × 16 |
| 3 × 3 × 16 Conv. stride 1 | 4 × 4 × 16 |
| Bilinear Upsample, scale 2 | 8 × 8 × 16 |
| 3 × 3 × 16 Conv. stride 1 | 8 × 8 × 16 |
| 5 × 5 × 16 Conv. stride 1 | 8 × 8 × 16 |
| Bilinear Upsample, scale 4 | 32 × 32 × 16 |
| 5 × 5 × 16 Conv. stride 1 | 32 × 32 × 16 |
| 5 × 5 × 8 Conv. stride 1 | 32 × 32 × 8 |
| Bilinear Upsample, scale 4 | 128 × 128 × 8 |
| 5 × 5 × 8 Conv. stride 1 | 128 × 128 × 8 |
| 5 × 5 × 16 Conv. stride 1 (no norm, sigmoid) | 128 × 128 × 16 |

Additionally, Table B below illustrates an example architecture for the encoder to generate embeddings from digital images.

TABLE B

Network architecture for $f_b$

| Layer | Activation Shape |
|---|---|
| Input | 128 × 128 × 3 |
| 5 × 5 × 1 Conv. stride 1 (no norm) | 128 × 128 × 1 |
| 8 × 8 × 16 Conv. stride 4 | 32 × 32 × 16 |
| 5 × 5 × 16 Conv. stride 1 | 32 × 32 × 16 |
| 8 × 8 × 16 Conv. stride 4 | 8 × 8 × 16 |
| 5 × 5 × 16 Conv. stride 1 | 8 × 8 × 16 |
| 5 × 5 × 16 Conv. stride 1 | 8 × 8 × 16 |
| Bilinear Upsample, scale 4 | 32 × 32 × 16 |
| 5 × 5 × 16 Conv. stride 1 | 32 × 32 × 16 |
| Channel-wise Concat with row 4 activation | 32 × 32 × 32 |
| 5 × 5 × 8 Conv. stride 1 | 32 × 32 × 8 |
| Bilinear Upsample, scale 4 | 128 × 128 × 8 |
| 5 × 5 × 8 Conv. stride 1 | 128 × 128 × 8 |

TABLE B-continued

Network architecture for $f_b$

| Layer | Activation Shape |
|---|---|
| Channel-wise Concat with row 2 activation | 128 × 128 × 9 |
| 5 × 5 × 16 Conv. stride 1 (no norm, sigmoid) | 128 × 128 × 16 |

Figure 6:
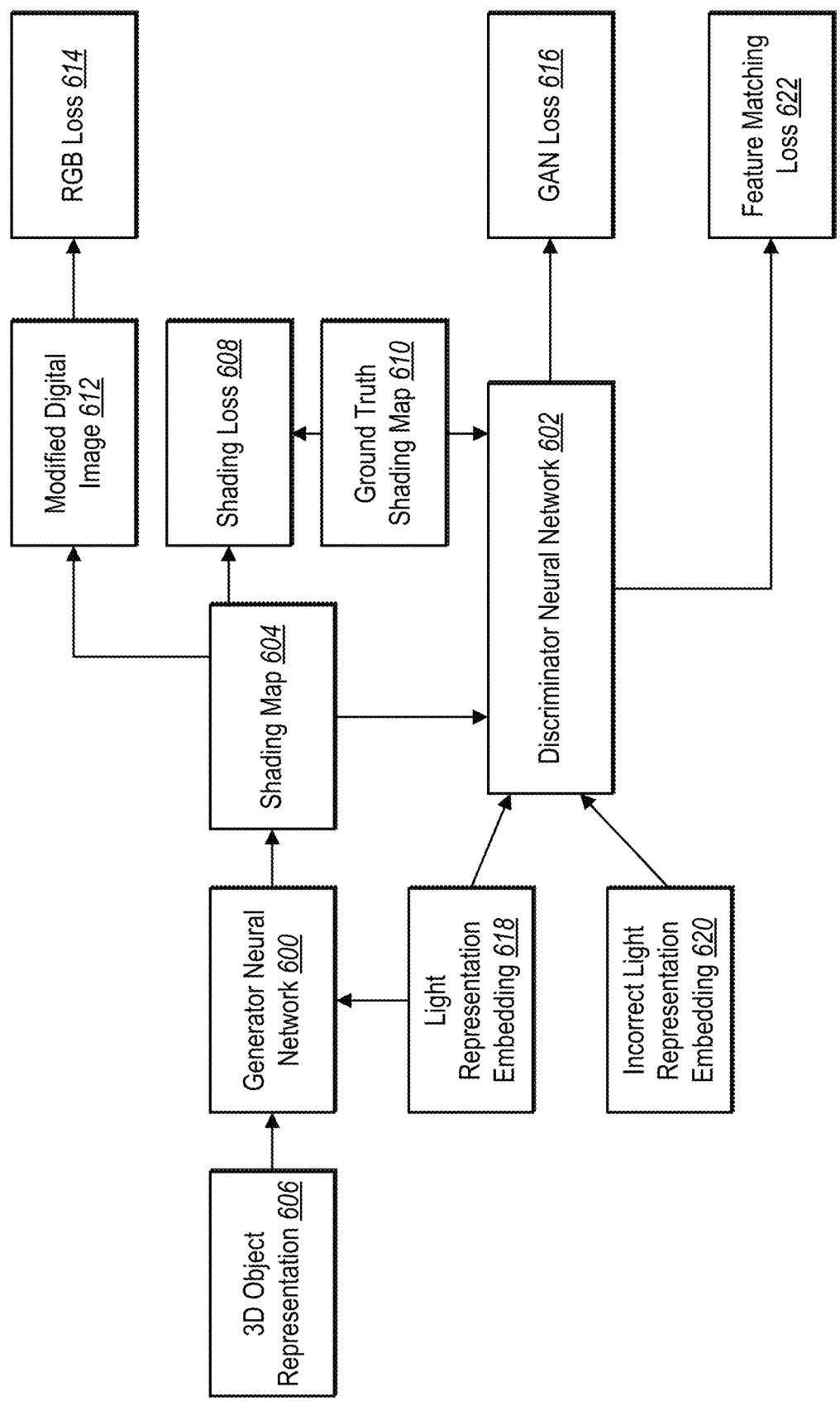
FIG. 6 illustrates a diagram of the digital object shading system determining losses for a generator neural network in accordance with one or more implementations.

In additional embodiments, the digital object shading system 102 also improves the performance of a generator neural network that generates shading maps for three-dimensional objects. Specifically, FIG. 6 illustrates that the digital object shading system 102 generates a plurality of losses via a shading map and an adversarial neural network that includes a generator neural network 600 and a discriminator neural network 602. The digital object shading system 102 then utilizes the losses to learn parameters of the generator neural network 600 and the discriminator neural network 602.

In one or more embodiments, the digital object shading system 102 utilizes the generator neural network 600 to generate a shading map 604 from a 3D object representation 606. In particular, the 3D object representation 606 includes at least a self-occlusion map for a three-dimensional object inserted into a digital image. Additionally, in one or more embodiments, the 3D object representation 606 includes a normal map and an albedo map of the three-dimensional object. The digital object shading system 102 thus utilizes the information about the three-dimensional object in the 3D object representation 606 to generate the shading map 604.

In one or more embodiments, the digital object shading system 102 determines a shading loss 608 from the shading map 604. For instance, in one or more embodiments, the digital object shading system 102 utilizes edge detection to increase the importance of regions of an image where self-shadowing occurs (e.g., based on bright-to-dark color changes in the self-occlusion map). To illustrate, the digital object shading system 102 utilizes multi-stage edge detection (e.g., Canny Edge Detection) to detect a number of different edges of the three-dimensional object. The digital object shading system 102 utilizes the computed edges from the foreground shading input as a regression loss's importance $x_w$ for each pixel of the digital image.

Additionally, given the predicted shading map $\hat{y}^{(i,j)}_s = \mathcal{G}(o^i, l_c^j)$ and the importance weights $x_w$, the digital object shading system 102 utilizes an $\ell_1$ regression loss (i.e., the shading loss 608) against the ground-truth shading map $y_s^{(i,j)}$ (ground-truth shading map 610) as $\mathcal{L}_s^{recon} = x_w \odot \|\hat{y}_s^{(i,j)} - y_s^{(i,j)}\|_1$, in which $\odot$ represents an element-wise product, and $\|\cdot\|_1$ represents the $\ell_1$-distance.

Furthermore, as mentioned, the digital object shading system 102 generates a modified digital image 612 based on the shading map 604. Based on the digital object shading system 102, the digital object shading system 102 determines an RGB loss 614 based on the modified digital image 612. Specifically, the digital object shading system 102 determines the RGB loss 614 based on color values in the modified digital image 612 and the shading map 604. To illustrate, the digital object shading system 102 generates the RGB loss 614 as $\mathcal{L}_g^{recon} \|\hat{y}_g^{(i,j)} - y_g^{(i,j)}\|_1$ in which the modified digital image 612 is created based on the model $\hat{y}_g^{(i,j)} = \hat{y}_s^{(i,j)} \odot a^i$, where $a^i$ is the albedo map. In one or more embodiments, the digital object shading system 102 does not use importance weighting on the modified digital image 612.

According to one or more embodiments, the generator neural network 600 includes a residual neural network-based generator $\mathcal{G}$ that takes as input a representation of a three-dimensional object $o^i=(n^i, a^i, r^i)$ including the normal ($n^i$) and albedo ($a^i$) maps rendered from the desired viewpoint along with the light representation embedding l and a self-occlusion map $r^i$ for the three-dimensional object. The generator outputs a shading map $y_s^{(i,j)}=\mathcal{G}(o^i,l_c^j)$. Given the normal, albedo, and shading maps of the foreground object, the background image, and a foreground mask, the synthesizes the harmonized output image using simple multiplication.

In one or more embodiments, the digital object shading system 102 utilizes the discriminator neural network 602 to improve the performance of the generator neural network 600. To illustrate, the discriminator neural network 602 helps fit the shading map 604 to the estimated light from a digital image and input conditions corresponding to the three-dimensional object. Specifically, the digital object shading system 102 utilizes the discriminator neural network 602 to determine a generative-adversarial network ("GAN") loss 616 based on lighting information associated with a digital image. For instance, the digital object shading system 102 utilizes predicted light representation embeddings and positive samples expected to have similar light representation embeddings (e.g., light representation embedding 618) and incorrect light representation embeddings 620 to determine the GAN loss 616. The digital object shading system 102 utilizes the GAN loss 616 to improve the performance of the generator neural network 600 for producing more accurate shading maps given the lighting conditions. The digital object shading system 102 also improves the performance of the discriminator neural network 602 for capturing more details by modeling the shading map at patch level, which causes the discriminator neural network 602 to provide stronger conditioning signals to the generator neural network 600.

According to one or more embodiments, the digital object shading system 102 designs a conditional discriminator $\mathcal{D}_{(s,l)}$ to fit an output $\hat{y}_s^{(i,j)}$ of a generator to the estimated light $l^j$ and input conditions $(n^i, a^i, r^i)=o^i$. The digital object shading system 102 utilizes a discriminator with label injection to model the conditions. The digital object shading system 102 thus determines a GAN loss 616 as:

$$\mathcal{L}_S^{GAN}(\theta_\mathcal{G}, \theta_\mathcal{D}) = \mathbb{E}_{y_s \sim p_{data}(y_s)}[\log\mathcal{D}(y_s^{(i,j)} \mid (o^i, l^j))] + \frac{1}{2}\mathbb{E}_{y_s \sim p_{data}(y_s)}[\log\mathcal{D}(\hat{y}_s^{(i,j)} \mid (o^i, l^{j+}))] + \frac{1}{2}\mathbb{E}_{y_s \sim p_{data}(y_s)}[\log\mathcal{D}(\hat{y}_s^{(i,j)} \mid (o^i, l^{j-}))]$$

in which $\hat{y}_s^{(i,j)}=\mathcal{G}(o^i,l^j)$. In particular, by feeding the predicted shading map $\hat{y}_s^{(i,j)}$ with the wrong light $l^{j-}$ in the last term of the GAN loss 616, the digital object shading system 102 causes the discriminator neural network 602 to become more sensitive to identify incorrect lighting information. In various embodiments, during training of the discriminator $\mathcal{D}$, the digital object shading system 102 can use $\{n^i\}$, $\{n^i, a^i\}$, or $\{n^i, a^i, r^i\}$ as the condition for the discriminator.

In one or more embodiments, to stabilize training of the adversarial neural network, the digital object shading system 102 also determines a feature matching loss 622 from the discriminator neural network 602. For instance, the digital object shading system 102 compares the shading map $\hat{y}_s$ to the ground-truth shading map $y_s$ at multiple layers of the discriminator neural network 602. Based on the $k^{th}$ layer feature from the input of the discriminator $\mathcal{D}$ as $\mathcal{D}^k$, the digital object shading system 102 generates the feature matching loss 622 ($\mathcal{L}_s^{FM}$) as:

$$\mathcal{L}_s^{FM} = \mathbb{E}_{(y_s, \hat{y}_s)} \sum_k \frac{1}{N^k} \|\mathcal{D}^k(y_s \mid (o, l)) - \mathcal{D}^k(\hat{y}_s \mid (o, l))\|_1$$

where $N^k$ represents the number of elements in the $k^{th}$ layer.

In one or more embodiments, the digital object shading system 102 utilizes the determined losses to train various neural networks used for generating modified digital images with consistent lighting of three-dimensional objects inserted into the digital images. For example, the digital object shading system 102 utilizes a contrastive learning loss $\mathcal{L}^{light}=\Sigma_j \ell_j^l$ for each background image j. Additionally, as noted, the digital object shading system 102 learns parameters of a generator neural network using an edge-guided shading map regression loss $\mathcal{L}_s^{recon}$ and an RGB regression loss $\mathcal{L}_g^{recon}$. The digital object shading system 102 also utilizes a discriminator that provides a condition mismatching signal to the generator via the GAN loss $\mathcal{L}_s^{GAN}$. Accordingly, the overall training loss function is represented as:

$$\min_{\theta_\mathcal{G}} \max_{\theta_\mathcal{D}} \mathcal{L}_s^{GAN}(\theta_\mathcal{G}, \theta_\mathcal{D}) + \mathcal{L}_s^{FM}(\theta_\mathcal{G}) + \mathcal{L}^{light}(\theta_\mathcal{G}) + \mathcal{L}_s^{recon}(\theta_\mathcal{G}) + \mathcal{L}_g^{recon}(\theta_\mathcal{G}),$$

where each $\mathcal{L}^{\{\cdot\}}$ has its own loss weight parameter for balancing the losses.

In a specific embodiment, the digital object shading system 102 constructs the shading pipeline after pre-processing a plurality of self-occlusion maps. In particular, to obtain faster ray-marching for generating self-occlusion maps, the digital object shading system 102 utilizes a previously generated library. The digital object shading system 102 then slices each rendered motion sequence by 10 frames from three different camera positions for training and 30 frames from a single camera position for testing. Additionally, the digital object shading system 102 slides the slicing window by half-sequence (e.g., 5 frames for training and 15 frames for testing) and drops the sequence with fewer frames. The digital object shading system 102 then loads the precomputed self-occlusion maps for faster data serving.

Additionally, the digital object shading system 102 samples positive and negative light representation embeddings with split representation learning during contrastive learning. More specifically, the digital object shading system 102 splits the dimension of light representation obtained from a network f, $l^j \in \mathbb{R}^{16}$, by half. In one or more embodiments, the digital object shading system 102 considers representations (e.g., for the first eight dimensions) from different camera perspectives, but with the same image-based lighting parameters obtained from the same motion sequence, as positive examples. The digital object shading system 102 also treats the same condition as a negative sample for the latter dimensions (e.g., the last eight dimensions) to imbue the difference between two major factors in shading-light sources and the relative position from the light sources. The digital object shading system 102 then computes the $\ell_2$ distance per each eight dimensions and average per category. Similarly, the digital object shading system 102 splits the last term into two cases-when the digital object shading system 102 provides an incorrect camera matrix and when the digital object shading system 102 provides an incorrect image-based lighting configuration in generating a light representation from a configuration. The digital object shading system 102 distributes the effect of those two configurations equally by computing the log-term for the two negative cases independently and divides each value by ½. To validate the effectiveness of the self-occlusion map r in shading generation, the digital object shading system 102 trains the model without r' as an ablation and determines that training with r' improves performance—i.e., the ablation model has lower performance in mean squared error ("MSE") ($8.12 \times 10^{-3}$), peak signal-to-noise ratio ("PSNR") ($33.71 \times 10^{0}$), and structural similarity ("SSIM") ($9.77 \times 10^{-1}$).

Additionally, the digital object shading system 102 performs more stable training by scaling the edge gradient mask $x_{\omega}$ by dividing the maximum value per channel, thereby keeping the value to be in a predictable range. For the feature matching loss, the digital object shading system 102 computes the feature distance from a second and a third convolutional layer output from the ϕ network. The digital object shading system 102 also sets $\mathcal{L}_s^{recon}$ as 10, $\mathcal{L}_g^{recon}$ as 10, $\mathcal{L}^{light}$ as 3000, and $\mathcal{L}_s^{FM}$ as 1000 during training. Furthermore, the digital object shading system 102 trained a network for 200 epochs with a batch size of 54 images per a graphics processing unit.

In one or more embodiments, the generator includes a plurality of residual blocks (e.g., 6 blocks) with a linear output layer for image generation (e.g., 128×128 images) with instance normalization, rectified linear unit activation, and a dropout of 0.5 per each block. Accordingly, for the input to the generator, the digital object shading system 102 feeds the albedo map, normal map, light representation embedding, and self-occlusion map by channel-wise concatenating them. For instance, the resulting input is 128×128×94. The resulting output is thus a 3-channel shading map 128×128×3 with linear activation to cover the range of shading more precisely.

In additional embodiments, the digital object shading system 102 utilizes a conditional discriminator $\mathcal{D}$ including a main shared stream network ϕ, a main downstream network ψ, and a pre-projection transformation network ω. For instance, Tables B, C, and D illustrate example architectures of the components of the conditional discriminator.

TABLE C

Network architecture for ϕ in $\mathcal{D}$.

| Layer | Activation Shape |
|---|---|
| Input | 128 × 128 × 6 |
| 3 × 3 × 3 Conv. stride 1 | 128 × 128 × 3 |
| 4 × 4 × 8 Conv. stride 2 | 64 × 64 × 8 |
| 4 × 4 × 16 Conv. stride 2 | 32 × 32 × 16 |
| 4 × 4 × 16 Conv. stride 2 | 16 × 16 × 16 |
| 4 × 4 × 16 Conv. stride 2 | 8 × 8 × 16 |

TABLE D

Network architecture for ψ in $\mathcal{D}$.

| Layer | Activation Shape |
|---|---|
| Input | 8 × 8 × 16 |
| 1 × 1 × 8 Conv. stride 1 | 8 × 8 × 8 |
| 1 × 1 × 1 Conv. stride 1 (no norm, linear) | 8 × 8 × 1 |

TABLE E

Network architecture for ω in $\mathcal{D}$.

| Layer | Activation Shape |
|---|---|
| Input | 128 × 128 × 16 |
| 5 × 5 × 8 Conv. stride 2 | 128 × 128 × 8 |
| 8 × 8 × 16 Conv. stride 4 | 32 × 32 × 16 |
| 4 × 4 × 16 Conv. stride 4 (no norm, linear) | 8 × 8 × 16 |

Using the three subnetworks ϕ, ψ, and ω, the digital object shading system 102 generates an output by ω(ϕ(y::õ))+ϕ(y::õ)·ω, where [::] represents channel-wise concatenation and [·] refers to channel-wise dot-product. In one or more embodiments, the digital object shading system 102 passes a hyperbolic tangent before feeding it to ϕ in order to prevent overflow such that $y = \tanh(y_s \text{ or } \hat{y}_s)$. In some embodiments, the digital object shading system 102 utilizes n instead of õ due to similar performance.

As mentioned previously, the digital object shading system 102 provides improved performance over existing systems. In particular, the digital object shading system 102 generates synthesized data with improved quality over data synthesized using other systems. In a specific training and testing embodiment, the digital object shading system 102 generates a dataset by animating and rendering synthetic objects (e.g., human models). Specifically, the digital object shading system 102 re-targets 398 randomly selected motion sequences from a first library into thirty-eight three-dimensional human models of a second library. The digital object shading system 102 renders images with three evenly distributed cameras in front of the human body for each animated sequence by randomly picking from a set of image-based lighting textures.

Additionally, the digital object shading system 102 determines materials of the human objects in the dataset including a diffuse bidirectional scattering distribution function ("BSDF") and microfacet glossy BSDF. The digital object shading system 102 renders the final images with Monte Carlo path tracing. Furthermore, the digital object shading system 102 places an infinite virtual ground plane under the foreground human objects to catch the shadows underneath with a different rendering algorithm. The digital object shading system 102 also sets each camera to track the chest of the object in the center and smooths the trajectory to avoid abrupt camera motion. The digital object shading system 102 also slightly perturbs the camera distance to bring more diversity. The dataset includes 212,955 frames. The digital object shading system 102 utilizes the rendered images from 30 characters for training and images from the remaining 8 characters for testing. Additionally, for each rendered image, the digital object shading system 102 has access to the three-dimensional mesh of the human object, the camera parameters, the image-based lighting configuration, albedo maps, foreground alpha masks, and surface normal maps recorded in camera space.

Because the digital object shading system 102 renders each animation sequence from three different viewpoints using the same image-based lighting configuration, the digital object shading system 102 samples positive and negative samples required by representation learning accordingly. Specifically, the digital object shading system 102 uses nearby frames in the animation along the time axis as positive pairs due to negligible changes in the camera settings. Additionally, the digital object shading system 102 samples three frames in a window of ten frames. For the same frame, the digital object shading system 102 also determines renderings from the different viewpoints as negative examples due to the different camera orientations.

The digital object shading system 102 compares the resulting process with four baselines: unpaired image transfer ("CUT"), paired image transfer ("pix2pixHD"), image harmonization ("DoveNet"), and OpenGL to physically based rendering ("Deep CG2Real"). In particular, for CUT and DoveNet, the digital object shading system 102 provides the human albedo map overlaid on the background as input and generates the harmonized composition. For pix2pixHD and Deep CG2Real, the digital object shading system 102 provides the albedo, normal, alpha, and background images as separate inputs to synthesize the foreground human object. The digital object shading system 102 trains each method for 200 epochs with feeding three frames from three different viewpoints as input for a fairer comparison.

CUT is described by Taesung Park, Alexei A. Efros, Richard Zhang, and Jun-Yan Zhu in "Contrastive learning for unpaired image-to-image translation" in Eur. Conf. Comput. Vis., 2020. Pix2pixHD is described by Ting-Chun Wang, Ming-Yu Liu, Jun-Yan Zhu, Andrew Tao, Jan Kautz, and Bryan Catanzaro in "High-resolution image synthesis and semantic manipulation with conditional GANs" in IEEE Conf. Comput. Vis. Pattern Recog., 2018. DoveNet is described by Wenyan Cong, Jianfu Zhang, Li Niu, Liu Liu, Zhixin Ling, Weiyuan Li, and Liqing Zhang in "DoveNet: Deep image harmonization via domain verification," in IEEE. Conf. Comput. Vis. Pattern Recog., 2020. Deep CG2Real is described by Sai Bi, Kalyan Sunkavalli, Federico Perazzi, Eli Shechtman, Vladimir Kim, and Ravi Ramamoorthi in "Deep CG2Real: Synthetic-to-real translation via image disentanglement," in Int. Conf Comput. Vis., 2019.

In one or more embodiments, the digital object shading system 102 performs evaluations of the processes with five different metrics over the rendered foreground human objects. The digital object shading system 102 utilizes MSE for directly measuring the distance in RGB space. To measure the visual quality, the digital object shading system 102 additionally uses PSNR and SSIM. The digital object shading system 102 also measures the temporal coherence of the sequences generated by each method by employing Frechet video distance ("FVD") as a video feature distribution distance and motion-based video integrity evaluation ("MOVIE"). Accordingly, the digital object shading system 102 feeds thirty frames per each test sequence with the first and last frame padded two times.

Table 1 below summarizes the quantitative results from the visual quality metrics among the different models.

| Model | MSE↓ | PSNR↑ | SSIM↑ | FVD↓ | MOVIE↓ |
| --- | --- | --- | --- | --- | --- |
| CUT | 12.44 | 31.41 | 9.66 | 12.99 | 2.45 |
| Pix2pixHD | 9.43 | 32.55 | 9.70 | 7.18 | 1.58 |
| DoveNet | 7.06 | 33.96 | 9.76 | 11.19 | 1.82 |
| Deep CG2Real | 12.73 | 31.64 | 9.58 | 8.46 | 2.52 |
| System 102 | 6.04 | 35.21 | 9.82 | 6.28 | 1.04 |

Figure 7:
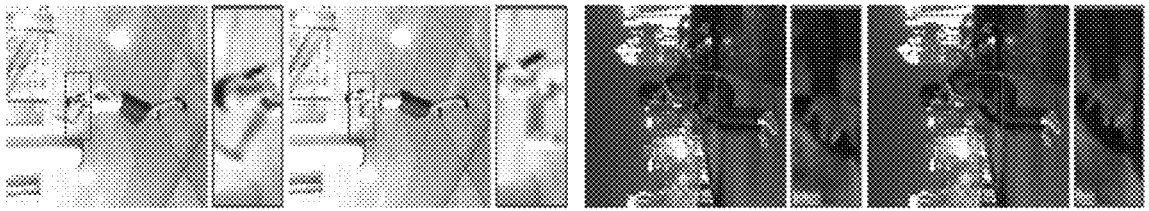
FIG. 7 illustrates digital images generated by various image generation systems including the digital object shading system in accordance with one or more implementations.
Figure 7:
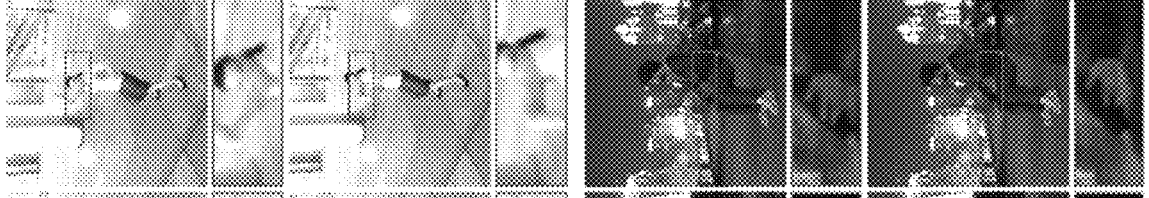
Figure 7:
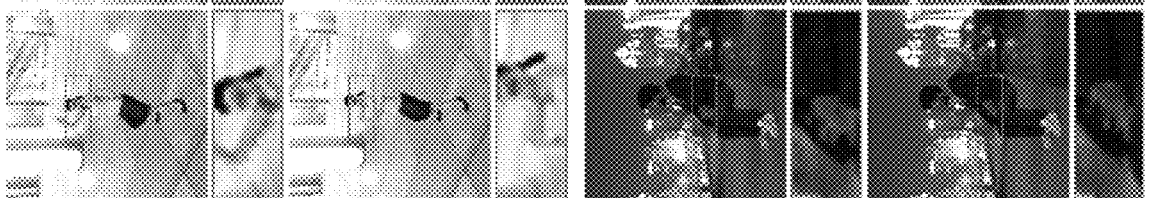
Figure 7:
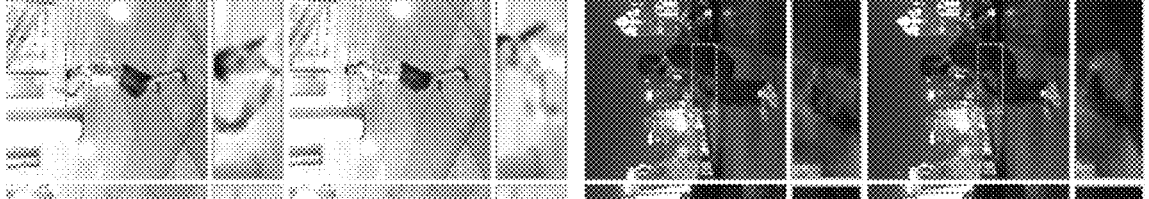
Figure 7:
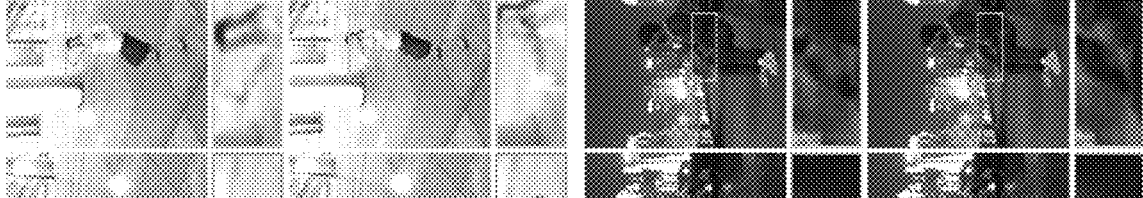
Figure 7:
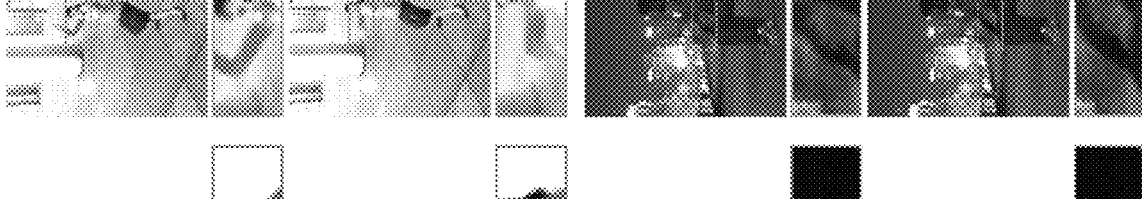
Figure 7:
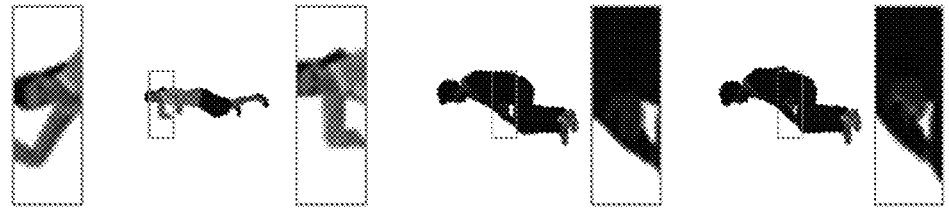

As shown, the digital object shading system 102 produces higher quality output than other baselines in all image distance (14.45% lower in MSE), image quality (3.68% higher in PSNR), and temporal stability (34.18% lower in MOVIE). FIG. 7 illustrates a set of images 700 the differences between the system 102 and the existing models based on the qualitative comparisons above and relative to a set of ground-truth images. Specifically, FIG. 7 illustrates visible pixel noise for the existing systems-especially for CUT, pix2pixHD, and DoveNet. Additionally, FIG. 7 illustrates that the generated results of the digital object shading system 102 ("System 102") are closer to the ground-truth images than the other systems. The digital object shading system 102 also generates results that are temporally-coherent due to the stability provided by the contrastive loss and feature learning approach.

Figure 8:
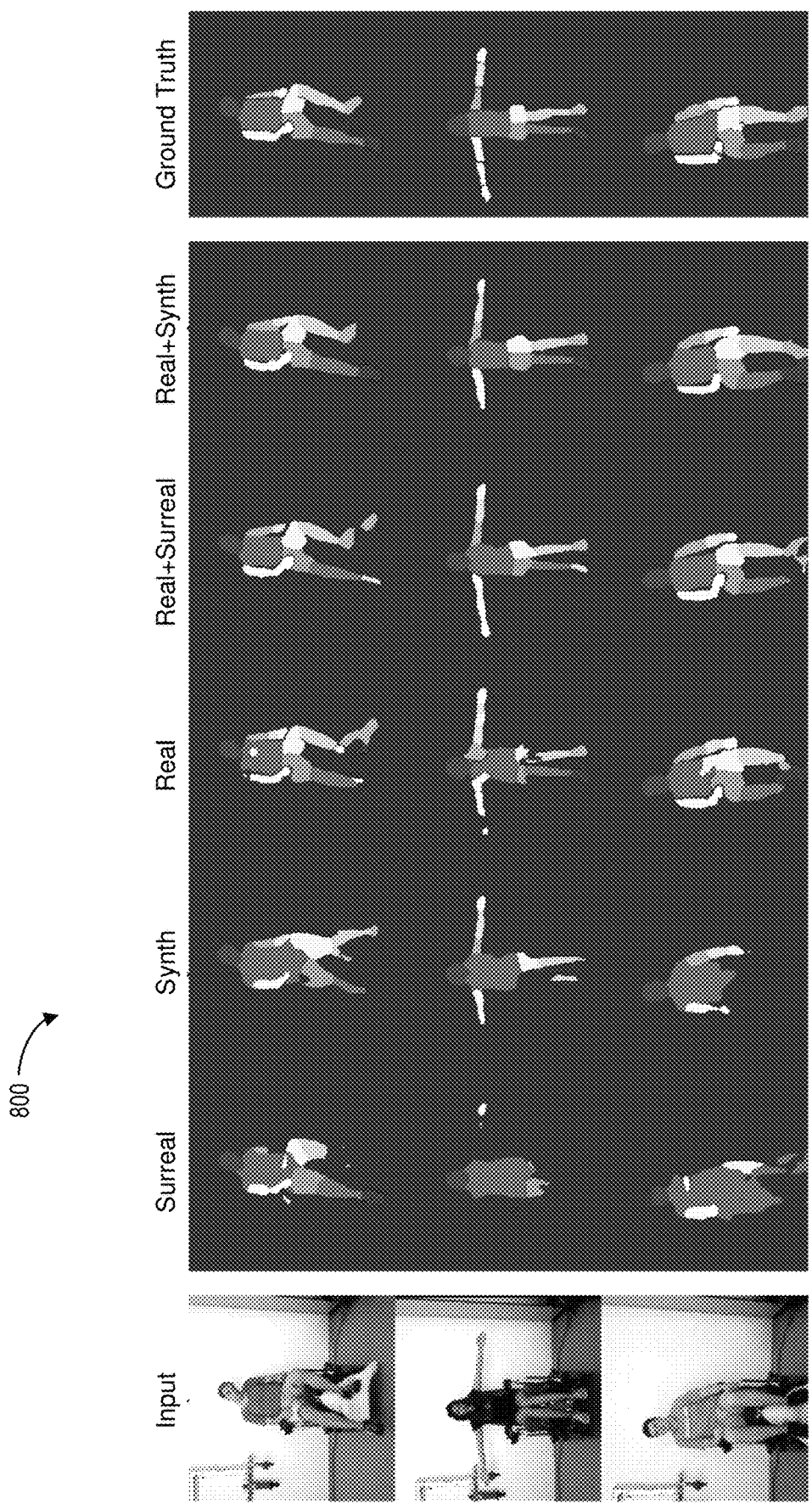
FIG. 8 illustrates object segmentations determined by a plurality of segmentation models based on datasets generated by various image generation systems including the digital object shading system in accordance with one or more implementations.

In one or more additional embodiments, as mentioned, the digital object shading system 102 also provides improvements to a segmentation machine-learning model. In particular, the digital object shading system 102 uses the digital image modification process to synthesize data for training convolutional neural networks for a part segmentation task (e.g., segmentation of object parts). FIG. 8 illustrates segmentation results 800 for models trained on synthesized training data (including synthetic images generated via the digital object shading system 102). For example, FIG. 8 illustrates part segmentation predictions on a plurality of images in a dataset utilizing the trained models.

As illustrated, FIG. 8 illustrates part segmentation predictions for a SURREAL model trained with a SURREAL dataset, as described by Gül Varol, Javier Romero, Xavier Martin, Naureen Mahmood, Michael J. Black, Ivan Laptev, and Cordelia Schmid in "Learning from synthetic humans," in IEEE Conf. Comput. Vis. Pattern Recog., 2017. Additionally, FIG. 8 illustrates part segmentation predictions by a model trained with data generated by the digital object shading system 102 ("Synth"). FIG. 8 also illustrates part segmentation predictions for a model trained with real-world images/data ("Real"). Furthermore, FIG. 8 illustrates part segmentation results for a model trained on a combination of real-world images and the SURREAL dataset ("Real+SURREAL") and a model trained on a combination of real-world images and data generated by the digital object shading system 102 ("Real+Synth").

In the embodiment of FIG. 8, the digital object shading system 102 modifies a synthetic data generation pipeline associated with the SURREAL dataset by rendering the albedo map and the foreground alpha over (256, 256) image scale by editing the original rendering pipeline. The digital object shading system 102 then feeds each input to the model by downscaling to 128 and then upscaling the output to (256, 256). The digital object shading system 102 synthesized the dataset to include 67,529 sequences with 100 or fewer frames per sequence. Additionally, the training, validation, and test split includes 50,806 training, 4,195 validation, and 12,528 testing sequences.

To evaluate the performance of the models, the embodiment of FIG. 8 tested convolutional neural networks trained with the synthesized data generated by the digital object shading system 102 on two different datasets. FIG. 8 illustrates the results for one of the two evaluation datasets. A first dataset includes 200 front-view images of (300, 300) from six subjects with fourteen human parts annotations. A second dataset includes a segmentation dataset that includes body part segmentation on (513, 513) with training/validation/test splits (5,703/1,423/1,389 images). The experiments used 3% of the training data, while the validation and test split remained the same.

Additionally, the digital object shading system 102 modified a version of a stacked hourglass network architecture in the SURREAL model for evaluating shading outputs of the digital object shading system 102. The digital object shading system 102 trained the "upscale" network in SURREAL that measures the performance on (256, 256) images for both datasets. The digital object shading system 102 also resized and cropped each image into (256, 256) for training and testing while training each model over 30 epochs each with a batch size of 4.

Furthermore, the experiment trains the model on (i) synthetic data only, (ii) real data only, (iii) finetuning a model from case (i) with real data. The experiment uses the mean and standard deviation of each dataset for whitening. For the synthetic data only cases, the experiment includes training on both the original SURREAL dataset and the Synth dataset. The experiment measures the performance on the Real dataset independently. The embodiment of FIG. 8 illustrates six-part segmentation. Table 2 below illustrates results of an intersection over union ("IoU") and pixel-level accuracy ("PixAcc") as evaluation metrics, while averaging human parts for all settings.

| Training Data | Dataset 1 | | Dataset 2 | |
| --- | --- | --- | --- | --- |
| | IoU | PixAcc | IoU | PixAcc |
| SURREAL | 20.50 | 24.24 | 14.31 | 15.57 |
| Synth | 32.70 | 41.52 | 28.97 | 34.93 |
| Real | 49.75 | 67.89 | 40.89 | 54.08 |
| Real + SURREAL | 63.59 | 75.52 | 43.90 | 58.66 |
| Real + Synth | 64.43 | 80.77 | 46.74 | 61.81 |

As shown, the best performing model is Real+Synth trained on a dataset generated by the digital object shading system 102.

In one or more embodiments, the digital object shading system 102 combines the above model for generating consisting shading for three-dimensional objects inserted into digital images with one or more additional models. To illustrate, the digital object shading system 102 combines the shading map and lighting information for the three-dimensional object with an additional model to perform three-dimensional scene understanding with a background image to determine shading cast by the three-dimensional object on the background. Thus, the digital object shading system 102 provides the improved shading caused by self-occlusion based on background lighting while also providing realistic shading caused by the three-dimensional object on the background.

Figure 9:
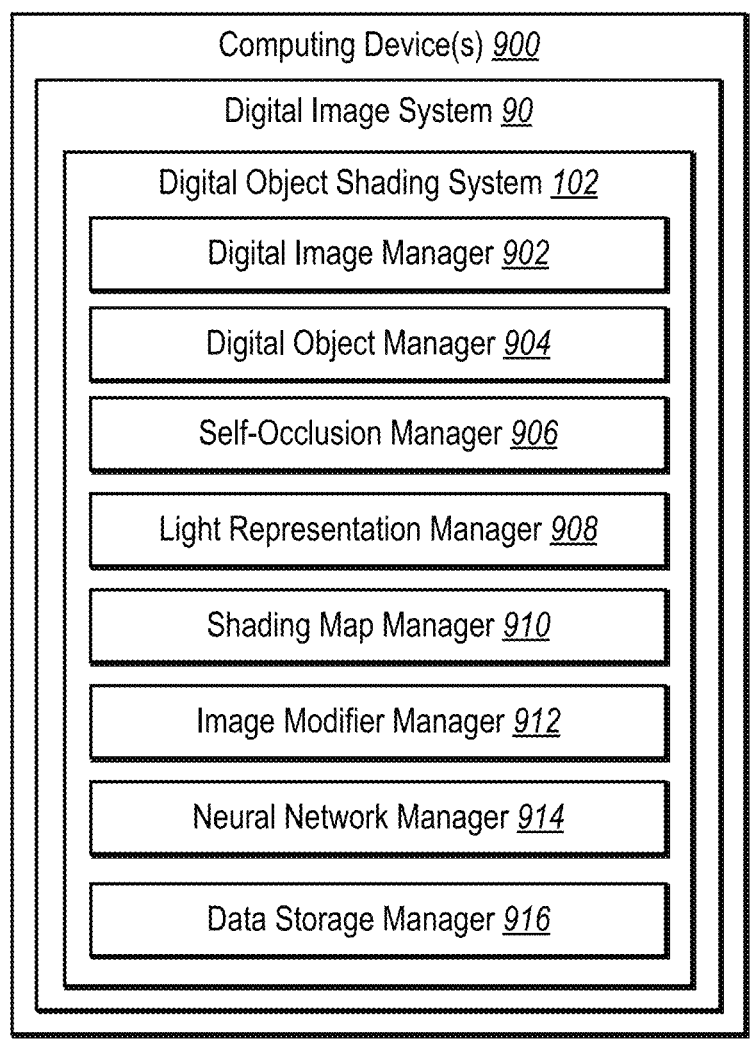
FIG. 9 illustrates a diagram of the digital object shading system of FIG. 1 in accordance with one or more implementations.

FIG. 9 illustrates a detailed schematic diagram of an embodiment of the digital object shading system 102 described above. As shown, the digital object shading system 102 is implemented in a digital image system 110 on computing device(s) 900 (e.g., a client device and/or server device as described in FIG. 1, and as further described below in relation to FIG. 11). Additionally, in one or more embodiments, the digital object shading system 102 includes, but is not limited to, a digital image manager 902, a digital object manager 904, a self-occlusion manager 906, a light representation manager 908, a shading map manager 910, an image modifier manager 912, a neural network manager 914, and a data storage manager 916. In one or more embodiments, the digital object shading system 102 is implemented in a distributed system of server devices for digital image modification and object shading. In alternative embodiments, the digital object shading system 102 is implemented within one or more additional systems. Alternatively, the digital object shading system 102 may be implemented on a single computing device such as a single client device.

In one or more embodiments, each of the components of the digital object shading system 102 is in communication with other components using any suitable communication technologies. Additionally, in some embodiments, the components of the digital object shading system 102 are in communication with one or more other devices including other computing devices of a user, server devices (e.g., cloud storage devices), licensing servers, or other devices/systems. It will be recognized that although the components of the digital object shading system 102 are shown to be separate in FIG. 9, any of the subcomponents may be combined into fewer components, such as into a single component, or divided into more components as may serve a particular implementation. Furthermore, although the components of FIG. 9 are described in connection with the digital object shading system 102, in one or more embodiments, at least some of the components for performing operations in conjunction with the digital object shading system 102 described herein are implemented on other devices within the environment.

In some embodiments, the components of the digital object shading system 102 include software, hardware, or both. For example, the components of the digital object shading system 102 include one or more instructions stored on a computer-readable storage medium and executable by processors of one or more computing devices (e.g., the computing device(s) 900). When executed by the one or more processors, the computer-executable instructions of the digital object shading system 102 cause the computing device(s) 900 to perform the operations described herein. Alternatively, the components of the digital object shading system 102 include hardware, such as a special purpose processing device to perform a certain function or group of functions. Additionally, or alternatively, the components of the digital object shading system 102 include a combination of computer-executable instructions and hardware.

Furthermore, the components of the digital object shading system 102 performing the functions described herein with respect to the digital object shading system 102 may, for example, be implemented as part of a stand-alone application, as a module of an application, as a plug-in for applications, as a library function or functions that may be called by other applications, and/or as a cloud-computing model. Thus, the components of the digital object shading system 102 may be implemented as part of a stand-alone application on a personal computing device or a mobile device. Alternatively, or additionally, the components of the digital object shading system 102 may be implemented in any application that provides digital image modification, including, but not limited to ADOBE® PHOTOSHOP®, ADOBE® AFTER EFFECTS®, ADOBE® DIMENSION®, AND ADOBE® AERO™ software. "ADOBE," "PHOTOSHOP," "ADOBE DIMENSION," "ADOBE AERO," AND "AFTER EFFECTS" are either registered trademarks or trademarks of Adobe Inc. in the United States and/or other countries.

As described herein, the digital image manager 902 facilitates storage and management of digital images. For example, the digital image manager 902 manages digital images including backgrounds such as photographs or synthetic images. Additionally, the digital image manager 902 stores parameters and/or metadata associated with digital images including image-based lighting parameters and/or camera parameters.

In one or more embodiments, the digital object manager 904 manages a plurality of digital three-dimensional objects for inserting into a plurality of digital images. In particular, the digital object manager 904 stores meshes for a plurality of three-dimensional models such as, but not limited to, human models, animal models, or models with complex surface details. In some embodiments, the digital object manager 904 stores object data including vertices, edges, faces, textures, or other data for constructing a three-dimensional object within a three-dimensional space.

The digital object shading system 102 also includes a self-occlusion manager 906 to generate and manage self-occlusion maps for three-dimensional objects. To illustrate, the self-occlusion manager 906 generates a self-occlusion map for a three-dimensional object by determining one or more portions of the three-dimensional object that occlude one or more other portions of the three-dimensional object. For instance, the self-occlusion manager 906 uniformly samples rays from points of the three-dimensional object to determine whether the rays intersect with the three-dimensional object. The self-occlusion manager 906 then generates the self-occlusion map based on the sampled rays.

The digital object shading system 102 further includes a light representation manager 908 to determine lighting information from digital images. For example, the light representation manager 908 utilizes a light encoder neural network to generate light representation embeddings for digital images. In some embodiments, during training of the light encoder neural network, the light representation manager 908 also generates light representation embeddings from ground-truth parameters associated with the digital images.

Additionally, the digital object shading system 102 includes a shading map manager 910 to generate shading maps for digital images. In particular, the shading map manager 910 utilizes a generator neural network to generate shading maps from lighting information about digital images and representations of three-dimensional objects. To illustrate, the shading map manager 910 utilizes light representation embeddings, self-occlusion maps, normal maps, and albedo maps to generate shading maps for three-dimensional objects inserted into digital images.

The digital object shading system 102 further includes an image modifier manager 912. Specifically, the image modifier manager 912 utilizes shading maps generated for digital images and three-dimensional models to generate modified digital images. Additionally, the image modifier manager 912 utilizes information about three-dimensional models such as digital masks and albedo maps for the three-dimensional models according to rendering views. The image modifier manager 912 thus modifies the digital images by inserting three-dimensional models into the digital images with consistent shading.

In one or more embodiments, the digital object shading system 102 includes a neural network manager 914 to manage a plurality of neural networks associated with modifying digital images to include three-dimensional objects with consistent shading. For instance, the neural network manager 914 manages a light encoder neural network, a generator neural network, and a discriminator neural network. Additionally, the neural network manager 914 determines losses at various stages of the digital image modification process. The neural network manager 914 also utilizes the losses to learn/update parameters of the neural networks.

The digital object shading system 102 also includes a data storage manager 916 (that comprises a non-transitory computer memory/one or more memory devices) that stores and maintains data associated with processing digital images and three-dimensional objects. For example, the data storage manager 916 stores data associated with generating and modifying digital images and interacting with three-dimensional objects. To illustrate, the data storage manager 916 stores information associated with neural networks, digital images, image lighting information, three-dimensional objects, and modified digital images.

Figure 10:
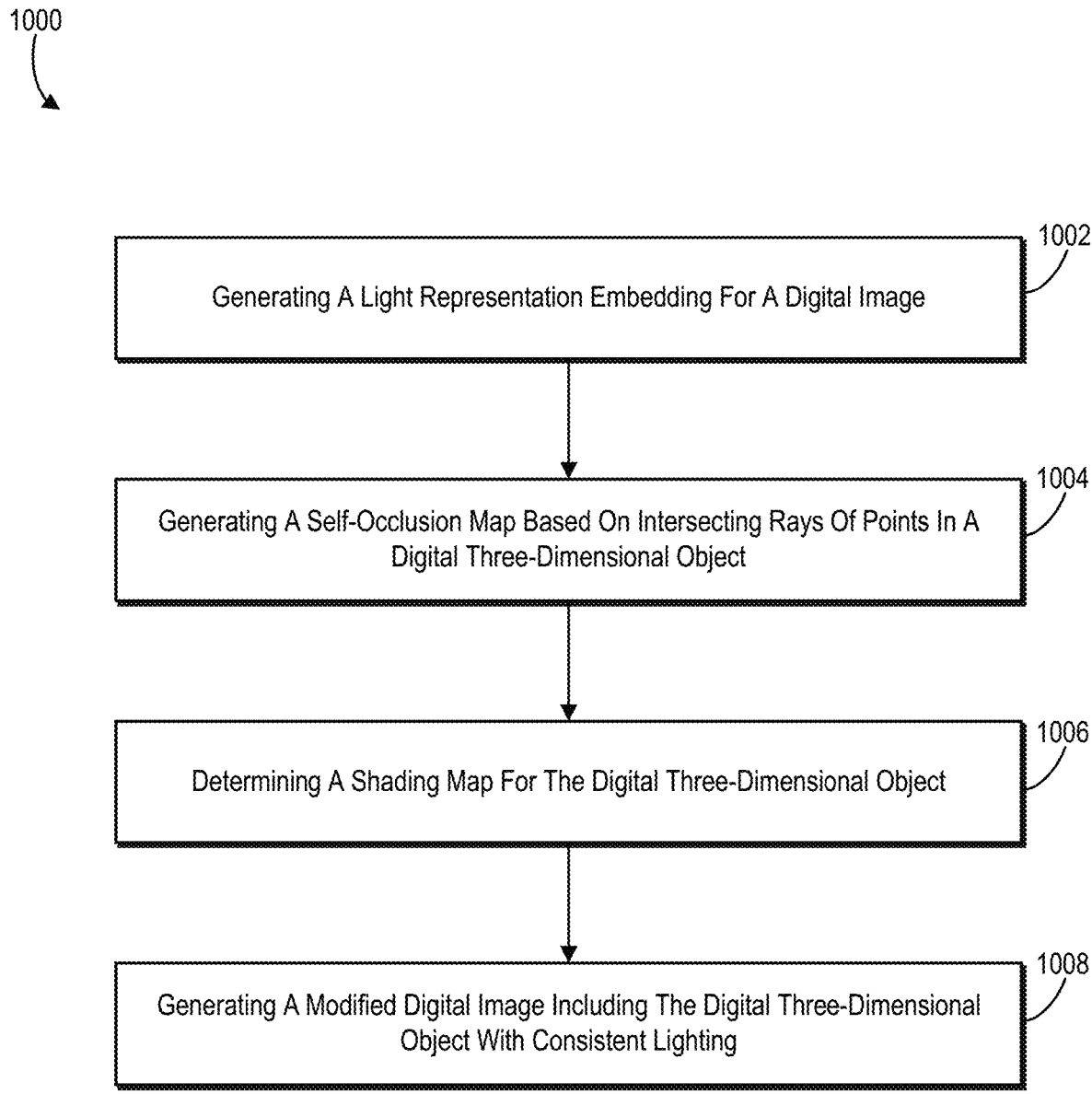
FIG. 10 illustrates a flowchart of a series of acts for generating a modified digital image by inserting a digital three-dimensional object with consistent lighting in accordance with one or more implementations.

Turning now to FIG. 10, this figure shows a flowchart of a series of acts 1000 of generating a modified digital image by inserting a digital three-dimensional object with consistent lighting. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10.

As shown, the series of acts 1000 includes an act 1002 of generating a light representation embedding for a digital image. For example, act 1002 involves generating a light representation embedding for lighting in a digital image utilizing a light encoder neural network.

Act 1002 involves generating the light representation embedding for lighting in the digital image by predicting the light representation embedding for lighting in the digital image utilizing the light encoder neural network comprising parameters learned utilizing contrastive learning based on a plurality of configuration parameters and a plurality of predicted light representation embeddings for a plurality of digital background images.

In one or more embodiments, act 1002 involves generating, utilizing a first light encoder, a first light representation embedding based on the configuration parameters comprising image-based lighting parameters and camera parameters stored for a digital background image of the plurality of digital background images. Act 1002, in one or more embodiments, also involves generating, utilizing a second light encoder, a second light representation embedding predicted from the digital background image of the plurality of digital background images.

In one or more embodiments, the light encoder neural network comprises parameters learned based on a contrastive loss determined from first light representation embeddings predicted from a plurality of digital background images and second light representations predicted from ground-truth lighting parameters and camera parameters of the plurality of digital background images. For example, act 1002 involves determining a contrastive loss based on a difference between the first light representation embedding and the second light representation embedding. Act 1002 then involves learning the parameters of the light encoder neural network based on the contrastive loss.

The series of acts 1000 also includes an act 1004 of generating a self-occlusion map based on intersecting rays of points in a digital three-dimensional object. For example, act 1004 involves generating a self-occlusion map for the digital three-dimensional object based on a plurality of intersecting rays from a plurality of points on the digital three-dimensional object visible within a camera view. In one or more embodiments, act 1004 involves determining a plurality of points on the digital three-dimensional object based on a camera position in a three-dimensional space. Additionally, act 1004, in one or more embodiments, also involves determining a plurality of uniformly sampled rays from the plurality of points that intersect with the digital three-dimensional object.

In one or more embodiments, act 1004 involves determining the plurality of points on the digital three-dimensional object by determining one or more portions of the digital three-dimensional object visible within a camera view based on the camera position in the three-dimensional space. For example, act 1004, in one or more embodiments, also involves determining the plurality of points on the digital three-dimensional object in the three-dimensional space by ray-marching from a camera position to the three-dimensional object within the three-dimensional space. Act 1004 then involves determining the plurality of points on the one or more surfaces of the digital three-dimensional object.

To illustrate, act 1004, in one or more embodiments, also involves determining, for each point of the plurality of points, a fixed set of rays sampled uniformly at equal angle intervals from the point. For example, act 1004 involves sampling, for a point on the digital three-dimensional object, a predetermined number of rays uniformly distributed around the point.

Act 1004 then involves generating, within a vector, the self-occlusion map comprising a plurality of values for the fixed set of rays indicating whether each ray of the fixed set of rays intersects with a portion of the digital three-dimensional object. For example, act 1004 involves sampling a plurality of rays at equal angle intervals from each point of the plurality of points. Act 1004 then involves determining whether the plurality of rays intersect with one or more surfaces of the digital three-dimensional object. Act 1004, in one or more embodiments, also involves generating a vector including a plurality of values indicating whether the plurality of rays intersect with the one or more surfaces of the digital three-dimensional object.

Act 1004, in one or more embodiments, also involves generating, within a vector of the self-occlusion map, a first value indicating that a first ray of the predetermined number of rays intersects with the digital three-dimensional object in response to detecting that the first ray intersects with the digital three-dimensional object. Act 1004 further involve generating, within the vector of the self-occlusion map, a second value indicating that a second ray of the predetermined number of rays does not intersect with the digital three-dimensional object in response to detecting that the second ray does not intersect with the digital three-dimensional object.

Additionally, the series of acts 1000 includes an act 1006 of determining a shading map for the digital three-dimensional object. For example, act 1006 involves determining, utilizing a generator neural network, a shading map for the digital three-dimensional object based on the light representation embedding and the self-occlusion map.

For instance, act 1006 involves extracting a normal map and an albedo map of the digital three-dimensional object rendered from a camera view based on the camera position in a three-dimensional space. Act 1006, in one or more embodiments, also involves extracting normal data and color data from the digital three-dimensional object by rendering the digital three-dimensional object at a first perspective from the camera view. Act 1006 also involves determining the normal data and the color data of the digital three-dimensional object from the first perspective. Act 1006 then involves determining, utilizing a generator neural network, a shading map for the digital three-dimensional object based on the light representation embedding, the self-occlusion map, the normal map, and the albedo map.

The series of acts 1000 further includes an act 1008 of generating a modified digital image including the digital three-dimensional object with consistent lighting. For example, act 1008 involves generating, utilizing the shading map, a modified digital image comprising the digital three-dimensional object inserted into the digital image with a lighting of the digital three-dimensional object consistent to the lighting in the digital image.

Act 1008, in one or more embodiments, involves generating a digital mask based on the digital three-dimensional object based on a camera view corresponding to the camera position. Act 1008 also involves inserting the digital three-dimensional object into the digital image with lighting consistent to the lighting in the digital image based on the digital mask, a shading map based on the self-occlusion map, and an albedo map for the digital three-dimensional object. To illustrate, act 1008, in one or more embodiments, involves generating the modified digital image by synthesizing the shading map, the color data, and a digital mask based on the digital three-dimensional object based on the camera view.

In one or more embodiments, the series of acts 1000 also includes determining a difference between the modified digital image to a ground-truth modified digital image comprising the digital three-dimensional object. The series of acts 1000 also includes learning parameters of a segmentation machine-learning model that segments digital objects in digital images based on the difference.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
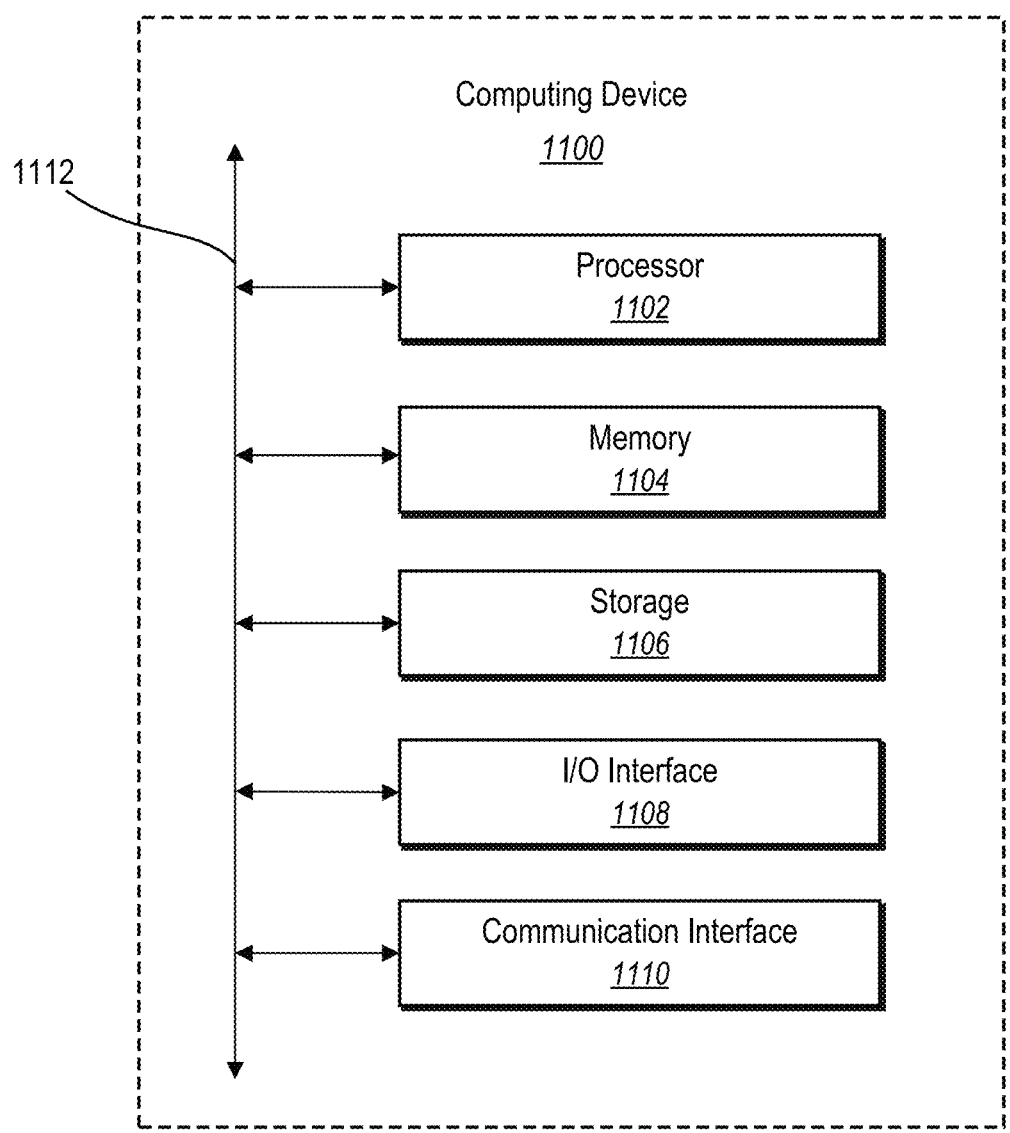
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that one or more computing devices such as the computing device 1100 may implement the system(s) of FIG. 1. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for dynamically modifying workflows, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions for performing the methods described herein.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example, and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
    generate a light representation embedding for lighting in a digital image by utilizing a light encoder neural network to extract lighting parameters from the digital image;
    generate a self-occlusion map for a digital three-dimensional object by:
        determining a plurality of points on the digital three-dimensional object visible within a field of view based on a camera position in a three-dimensional space;
        generating, for a plurality of uniformly sampled rays from a point of the plurality of points, a vector comprising a plurality of intersection values, an intersection value of the plurality of intersection values indicating whether a sampled ray of the plurality of uniformly sampled rays intersects with the digital three-dimensional object; and
    generate a modified digital image comprising the digital three-dimensional object inserted into the digital image based on the light representation embedding and the self-occlusion map.

2. The non-transitory computer readable storage medium as recited in claim 1, further comprising instructions that, when executed by the at least one processor, cause the computing device to determine the plurality of points on the digital three-dimensional object by determining one or more portions of the digital three-dimensional object visible within the field of view of a camera view based on the camera position in the three-dimensional space.

3. The non-transitory computer readable storage medium as recited in claim 1, further comprising instructions that, when executed by the at least one processor, cause the computing device to generate the vector by:
    determining, for each point of the plurality of points, a fixed set of rays sampled uniformly at equal angle intervals from the point; and
    determining whether the fixed set of rays intersect with one or more portions of the digital three-dimensional object.

4. The non-transitory computer readable storage medium as recited in claim 1, further comprising instructions that, when executed by the at least one processor, cause the computing device to generate the self-occlusion map by generating a plurality of vectors for the plurality of points, each vector of the plurality of vectors comprising a plurality of intersection values indicating whether a plurality of sets of rays sampled from the plurality of points intersect with at least a portion of the digital three-dimensional object.

5. The non-transitory computer readable storage medium as recited in claim 1, further comprising instructions that, when executed by the at least one processor, cause the computing device to:
    extract a normal map and an albedo map of the digital three-dimensional object rendered from a camera view based on the camera position in the three-dimensional space; and
    determine, utilizing a generator neural network, a shading map for the digital three-dimensional object based on the light representation embedding, the self-occlusion map, the normal map, and the albedo map.

6. The non-transitory computer readable storage medium as recited in claim 1, further comprising instructions that, when executed by the at least one processor, cause the computing device to generate the light representation embedding for lighting in the digital image by predicting the light representation embedding for lighting in the digital image utilizing the light encoder neural network comprising parameters learned utilizing contrastive learning based on a plurality of configuration parameters and a plurality of predicted light representation embeddings for a plurality of digital background images.

7. The non-transitory computer readable storage medium as recited in claim 6, further comprising instructions that, when executed by the at least one processor, cause the computing device to:
    generate, utilizing a first light encoder, a first light representation embedding based on the plurality of configuration parameters comprising image-based lighting parameters and camera parameters stored for a digital background image of the plurality of digital background images;
    generate, utilizing a second light encoder, a second light representation embedding predicted from the digital background image of the plurality of digital background images;
    determine a contrastive loss based on a difference between the first light representation embedding and the second light representation embedding; and learn the parameters of the light encoder neural network based on the contrastive loss.

8. The non-transitory computer readable storage medium as recited in claim 1, further comprising instructions that, when executed by the at least one processor, cause the computing device to generate the modified digital image by:
generating a digital mask based on the digital three-dimensional object based on a camera view corresponding to the camera position; and
inserting the digital three-dimensional object into the digital image with lighting consistent to the lighting in the digital image based on the digital mask, a shading map based on the self-occlusion map, and an albedo map for the digital three-dimensional object.

9. A system comprising:
one or more memory devices comprising a digital image and a digital three-dimensional object; and
one or more processors configured to cause the system to:
generate a light representation embedding for lighting in the digital image by utilizing a light encoder neural network to extract lighting parameters from the digital image;
generate a self-occlusion map for the digital three-dimensional object by:
determining a plurality of points on the digital three-dimensional object visible within a field of view based on a camera position in a three-dimensional space; and
generating, for a plurality of uniformly sampled rays from a point of the plurality of points, a vector comprising a plurality of intersection values, an intersection value of the plurality of intersection values indicating whether a sampled ray of the plurality of uniformly sampled rays intersects with the digital three-dimensional object;
determine, utilizing a generator neural network, a shading map for the digital three-dimensional object based on the light representation embedding and the self-occlusion map; and
generate, utilizing the shading map, a modified digital image comprising the digital three-dimensional object inserted into the digital image with lighting of the digital three-dimensional object consistent to the lighting in the digital image.

10. The system as recited in claim 9, wherein the one or more processors are further configured to cause the system to generate the self-occlusion map for the digital three-dimensional object by:
determining the plurality of points on the digital three-dimensional object visible within the field of view based on the camera position in the three-dimensional space by ray-marching from the camera position to the digital three-dimensional object within the three-dimensional space; and
determining the plurality of uniformly sampled rays from a fixed set of rays corresponding to each point of the plurality of points.

11. The system as recited in claim 10, wherein the one or more processors are further configured to cause the system to determine the plurality of uniformly sampled rays from the fixed set of rays by:
sampling, for a point on the digital three-dimensional object, a predetermined number of rays uniformly distributed around the point; and
determining, for the point on the digital three-dimensional object, whether each ray of the predetermined number of rays intersects with the digital three-dimensional object.

12. The system as recited in claim 11, wherein the one or more processors are further configured to cause the system to:
generate, within the vector of the self-occlusion map, a first value indicating that a first ray of the plurality of uniformly sampled rays intersects with the digital three-dimensional object in response to detecting that the first ray intersects with the digital three-dimensional object; and
generate, within the vector of the self-occlusion map, a second value indicating that a second ray of the plurality of uniformly sampled rays does not intersect with the digital three-dimensional object in response to detecting that the second ray does not intersect with the digital three-dimensional object.

13. The system as recited in claim 9, wherein the one or more processors are further configured to cause the system to:
extract normal data and color data from the digital three-dimensional object by:
rendering the digital three-dimensional object at a first perspective from a camera view; and
determining the normal data and the color data of the digital three-dimensional object from the first perspective; and
generate, utilizing the generator neural network, the shading map based on the light representation embedding and a representation of the digital three-dimensional object comprising the self-occlusion map, the normal data, and the color data.

14. The system as recited in claim 13, wherein the one or more processors are further configured to cause the system to generate the modified digital image by synthesizing the shading map, the color data, and a digital mask based on the digital three-dimensional object based on the camera view.

15. The system as recited in claim 9, wherein the one or more processors are further configured to cause the system to:
determine a difference between the modified digital image and a ground-truth modified digital image comprising the digital three-dimensional object; and
learn parameters of a segmentation machine-learning model that segments digital objects in digital images based on the difference.

16. A computer-implemented method comprising:
generating a light representation embedding for lighting in a digital image by utilizing a light encoder neural network to extract lighting parameters from the digital image;
extracting a normal map and an albedo map for a digital three-dimensional object rendered from a camera view;
generating a self-occlusion map for the digital three-dimensional object by:
determining a plurality of points on the digital three-dimensional object visible within a field of view based on a camera position in a three-dimensional space; and
generating, for a plurality of uniformly sampled rays from a point of the plurality of points, a vector comprising a plurality of intersection values, an intersection value of the plurality of intersection values indicating whether a sampled ray of the plurality of uniformly sampled rays intersects with the digital three-dimensional object;

determining, utilizing a generator neural network, a shading map for the digital three-dimensional object based on the light representation embedding, the self-occlusion map, the normal map, and the albedo map; and generating, utilizing the shading map, a modified digital image comprising the digital three-dimensional object inserted into the digital image with lighting of the digital three-dimensional object consistent to the lighting in the digital image.

17. The computer-implemented method as recited in claim 16, further comprising determining the plurality of points on the digital three-dimensional object visible within the camera view by:

determining one or more visible surfaces of the digital three-dimensional object by ray-marching from the camera position to the digital three-dimensional object in a three-dimensional space; and determining the plurality of points on the one or more visible surfaces of the digital three-dimensional object.

18. The computer-implemented method as recited in claim 17, wherein generating the self-occlusion map comprises:

determining the plurality of uniformly sampled rays by sampling rays at equal angle intervals from each point of the plurality of points; and determining whether the rays intersect with one or more surfaces of the digital three-dimensional object; and generating the vector including of the plurality of intersection values in response to determining whether the rays intersect with the one or more surfaces of the digital three-dimensional object.

19. The computer-implemented method as recited in claim 16, wherein generating the shading map comprises generating, utilizing the generator neural network, the shading map based on the light representation embedding and a representation of the digital three-dimensional object comprising the self-occlusion map and normal data and color data extracted from the digital three-dimensional object.

20. The computer-implemented method as recited in claim 16, wherein the light encoder neural network comprises parameters learned based on a contrastive loss determined from first light representation embeddings predicted from a plurality of digital background images and second light representations predicted from ground-truth lighting parameters and camera parameters of the plurality of digital background images.

* * * * *